(12) United States Patent
Rieder et al.

(10) Patent No.: US 7,216,549 B2
(45) Date of Patent: May 15, 2007

(54) VIBRATION-TYPE MEASUREMENT TRANSDUCER

(75) Inventors: Alfred Rieder, Landshut (DE);
Christian Schuetze, Basel (CH);
Martin Anklin-Imhof, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/266,283

(22) Filed: Nov. 4, 2005

(65) Prior Publication Data
US 2006/0107758 A1 May 25, 2006

Related U.S. Application Data

(60) Provisional application No. 60/635,483, filed on Dec. 14, 2004.

(30) Foreign Application Priority Data

Nov. 4, 2004 (DE) .................. 10 2004 053 883
Dec. 14, 2004 (DE) .................. 10 2004 060 415

(51) Int. Cl.
*G01F 1/84* (2006.01)
(52) U.S. Cl. ................................. 73/861.355
(58) Field of Classification Search ........... 73/861.355, 73/861.351, 861.354, 831.357
See application file for complete search history.

(56) References Cited

U.S. PATENT DOCUMENTS 5,261,284 A 11/1993 Hopkinson
5,705,754 A 1/1998 Keita
6,412,355 B1 * 7/2002 Haberli et al. .......... 73/861.356
6,484,591 B2 * 11/2002 Drahm et al. ........... 73/861.355

(Continued)

FOREIGN PATENT DOCUMENTS

DE 102 37 209 B4 7/2004

(Continued)

OTHER PUBLICATIONS

US 6,044,715, 04/2000, Ollila (withdrawn)

*Primary Examiner*—Jewel Thompson
(74) *Attorney, Agent, or Firm*—Bacon & Thomas, PLLC

(57) ABSTRACT

A measurement transducer includes a transducer housing, which exhibits a multiplicity of natural oscillation modes and at least a first measuring tube for conveying at least a volume fraction of the medium to be measured. The measuring tube is held to oscillation in the transducer housing and vibrator, at least at times. Also included is an electromechanical, exciter mechanism acting on the at least one measuring tube and a sensor arrangement reacting to movements, i.e. bending oscillations, of the measuring tube. Also included is a first support element fixed, i.e. directly, to the transducer housing and serving for the formation of essentially locationally fixed oscillation nodes in the transducer housing for suppressing or erasing at least one natural oscillation mode of the transducer housing. An outer oscillation system is formed by the transducer housing and at least the at least one support element and an inner oscillation system is formed by the at least one measuring tube, the medium at least instantaneously conveyed therein, and, at least in part, by the exciter mechanism and the sensor arrangement. The inner oscillation system, executes, at least at times during operation of the measurement transducer, mechanical oscillations, especially in the form of lateral oscillations.

38 Claims, 8 Drawing Sheets

U.S. PATENT DOCUMENTS

| | | | |
|---|---|---|---|
| 6,860,158 B2 * | 3/2005 | Bitto et al. | 73/861.355 |
| 6,902,798 B2 * | 6/2005 | Ghosh et al. | 428/317.9 |
| 6,957,587 B2 * | 10/2005 | Bitto et al. | 73/861.355 |
| 2002/0152819 A1 | 10/2002 | Rieder | |
| 2002/0157479 A1 | 10/2002 | Crisfield | |
| 2003/0233868 A1 | 12/2003 | Rieder | |
| 2004/0045369 A1 | 3/2004 | Bitto | |
| 2005/0039547 A1 | 2/2005 | Bitto | |

FOREIGN PATENT DOCUMENTS

| | | |
|---|---|---|
| EP | 1 020 712 A1 | 7/2000 |
| EP | 1 091 196 A2 | 4/2001 |
| EP | 1 279 935 A2 | 1/2003 |
| EP | 1 429 119 A1 | 6/2004 |
| WO | WO 2004/025228 A1 | 3/2004 |
| WO | WO 2004/009735 A1 | 11/2004 |

* cited by examiner

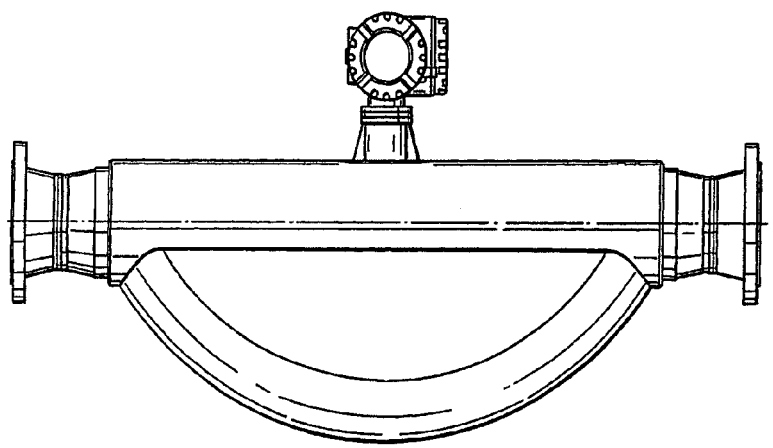
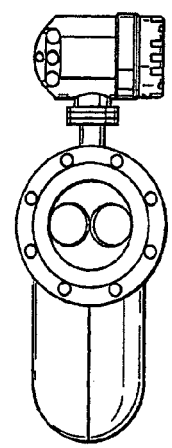
Fig. 1a    Fig. 1b
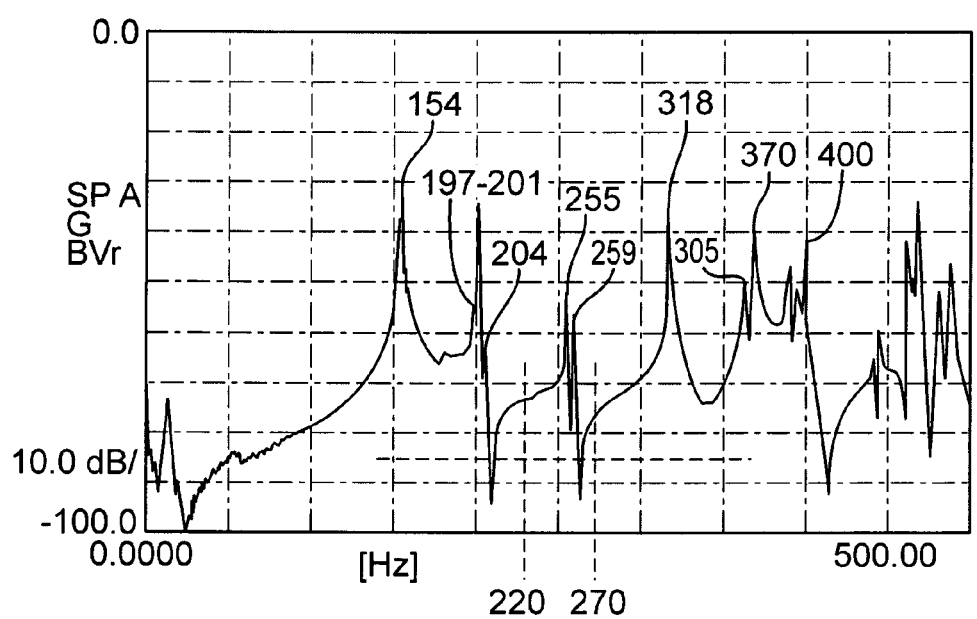
Fig. 2

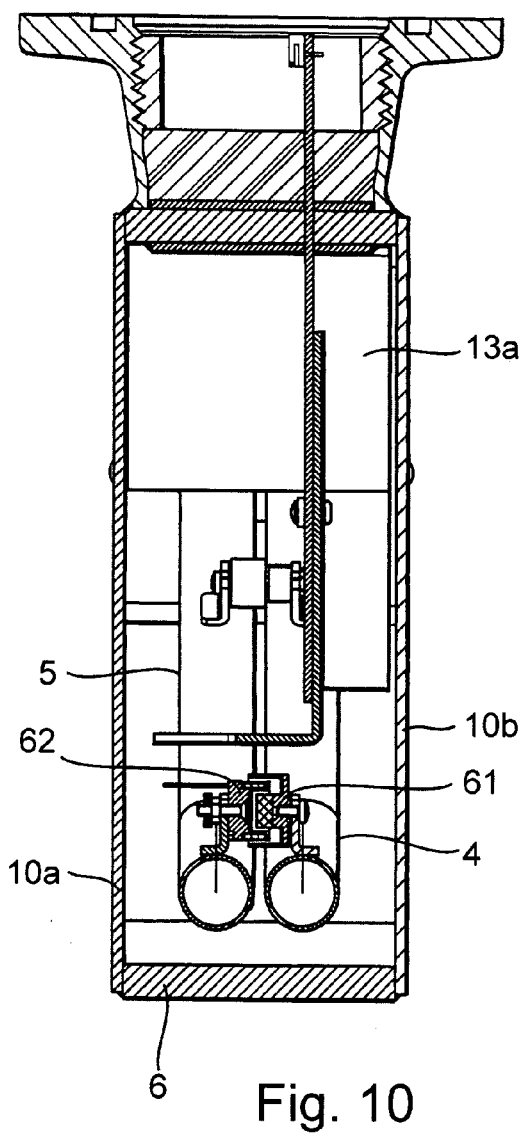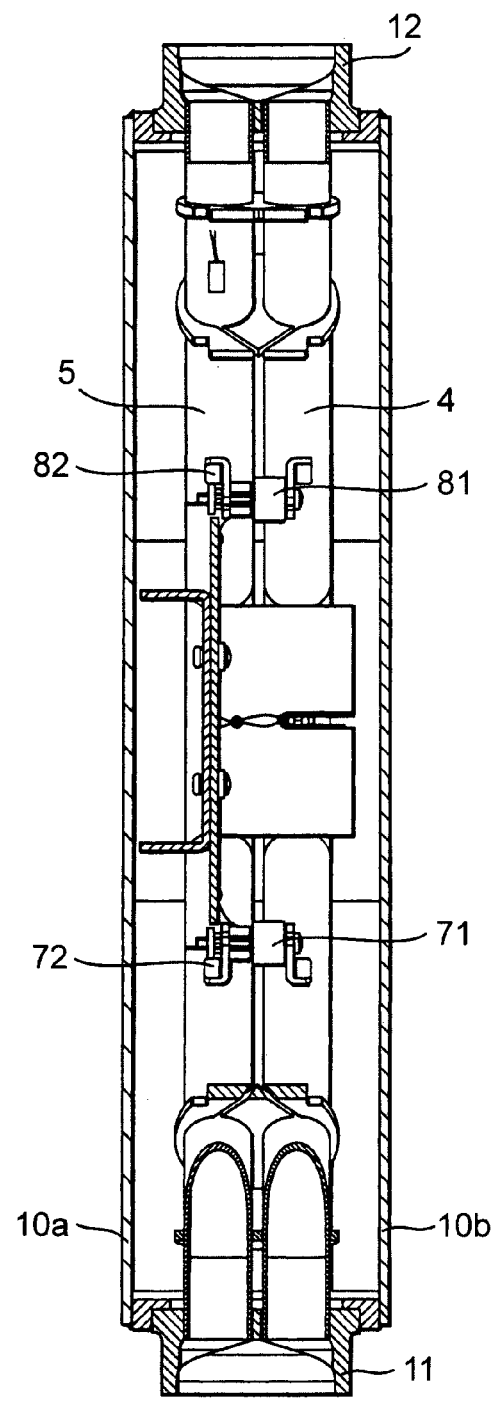
Fig. 10
Fig. 11

VIBRATION-TYPE MEASUREMENT TRANSDUCER

FIELD OF THE INVENTION

The invention relates to a vibration-type measurement transducer for measuring a flowable medium, especially a gas, liquid, powder or other flowable substance, conveyed in a pipeline.

BACKGROUND OF THE INVENTION

In the technology of process measurements and automation, physical parameters, such as e.g. mass flow rate, density and/or viscosity, of a medium flowing in a pipeline are often measured using inline measuring devices, which include a vibratory measurement transducer, through which the medium flows, and a measurement and operating circuit connected thereto, for effecting reaction forces in the medium, such as e.g. Coriolis forces corresponding to the mass flow rate, inertial forces corresponding to the density of the medium and/or frictional forces corresponding to the viscosity of the medium, etc., and for producing, derived from these forces, measurement signals respectively representing mass flow rate, density and viscosity.

Such measurement transducers, especially those in the form of Coriolis mass flow meters or Coriolis mass flow/density meters, are described in detail e.g. in WO-A 04/038341, WO-A 03/076879, WO-A 03/027616, WO-A 03/021202, WO-A 01/33174, WO-A 00/57141, WO-A 98/07009, U.S. Pat. Nos. 6,711,958, 6,666,098, 6,308,580, 6,092,429, 5,796,011, 5,301,557, 4,876,898, EP-A 553 939, EP-A 1 001 254, EP-A 1 448 956, or EP-A 1 421 349. For conveying the medium, flowing at least at times, the measurement transducers include at least one measuring tube, which is secured appropriately oscillatably to a usually thicker-walled, especially tubular and/or beam-like, carrier cylinder or in a carrier frame. For producing the above-mentioned reaction forces, the measuring tube is caused to vibrate during operation, driven by a, usually, electrodynamic exciter mechanism. For detecting vibrations of the measuring tube, especially inlet, and outlet, end vibrations, and for producing at least one oscillation measurement signal representing such, these measurement transducers additionally include a sensor arrangement reacting to movements, and thus also to mechanical oscillations, of the measuring tube.

During operation, the above-described, inner oscillation system of the measurement transducer, formed by the at least one measuring tube, by the medium conveyed at least instantaneously therein, and, at least in part, by the exciter mechanism and sensor arrangement, is excited by means of the electromechanical exciter mechanism, at least at times, to execute mechanical oscillations in a wanted oscillation mode at at least one, dominating, wanted oscillation frequency. These oscillations in the so-called wanted oscillation mode are, mostly, especially in the case of application of the measurement transducer as a Coriolis mass flow and/or density meter, at least partially developed as lateral oscillations. In such case, the wanted oscillation frequency is selected to be a natural, instantaneous resonance frequency of the internal oscillation system, which, in turn, depends on size, form and material of the measuring tube, as well as also on the instantaneous density of the medium; where appropriate, the wanted oscillation frequency can also be significantly influenced by an instantaneous viscosity of the medium. Due to fluctuating density of the medium to be measured and/or due to medium changes effected during operation, the wanted oscillation frequency is naturally changeable during operation of the measurement transducer, at least within a calibrated, and, to that extent, predetermined, wanted frequency band, which has, correspondingly, predetermined lower and upper frequency limits.

The inner oscillation system of the measurement transducer formed together by the at least one measuring tube, the exciter mechanism and the sensor arrangement is, furthermore, usually accommodated in a transducer housing having, as an integral component, a carrier frame, or carrier cylinder, as the case may be. This housing can likewise have a large number of natural oscillation modes. Suitable transducer housings for vibration-type measurement transducers are described, for example, in WO-A 03/076879, WO-A 03/021202, WO-A 01/65213, WO-A 00/57141, U.S. Pat. Nos. 6,776,052, 6,711,958, 6,044,715, 5,301,557 or EP-A 1 001 254. The housing caps of such transducer housings are usually manufactured in one piece by means of deep-drawn intermediates. Additionally, however, these housing caps can, especially in the case of larger dimensions, be composed of separate, shell-shaped, intermediate pieces, as is proposed e.g. also in WO-A 03/021202. The transducer housing described in WO-A 03/021202 is formed by means of a support tube and a housing cap welded therewith, with the housing cap itself including, due to the special manufacturing, an upper, essentially trough-shaped, first housing segment with a first segment edge and a second segment edge formed essentially identically to the first segment edge, an essentially planar, second housing segment, which is connected via its first segment edge with the first segment edge of the first housing segment, and a third housing segment essentially mirror-symmetric to the second housing segment and connected via its first segment edge with the second segment edge of the first housing segment.

Transducer housings of the described kind serve, besides for holding the at least one measuring tube, additionally also for protecting the measuring tube, the exciter mechanism and the sensor arrangement, as well as other internally situated components, from external, environmental influences, such as e.g. dust or water spray. The user also frequently requires that such transducer housings, and especially their housing cap, be able to withstand, leak-free, at least for a predetermined time, the internal pressure, mostly lying markedly above the external pressure, arising in the case of a bursting of the tube segment of the measuring tube. At least for applications involving toxic or easily ignitable media, the transducer housing must, in cases, also be able to fulfill the requirements applicable for a safety container. Additionally, also a sufficient damping of sound emissions possibly produced by the measurement transducer is required.

Development in the field of vibration-type measurement transducers has, in the meantime, reached such a level, that modern measurement transducers of the described kind can be used practically for almost all applications of flow measurement technology and can satisfy the highest requirements of this field. Thus, such measurement transducers are used in practice for mass flow rates of only a few g/h (grams per hour) up to several t/h (tonnes per hour), at pressures of up to 100 bar for liquids or even over 300 bar for gases. The achieved accuracy of measurement in such cases lies usually at about 99.9% of the actual value, or higher, or a measurement error of about 0.1%, with a lower limit of the guaranteed measurement range lying quite easily at about 1% of the measurement range end value. Due to the high bandwidth of their possibilities for use, measurement transducers of the described kind are offered, depending on application, additionally with nominal diameters lying, measured at the flange, between 1 mm and 250 mm or even above.

As the nominal diameters of vibration-type transducers become always larger, their installed mass practically inherently also becomes larger. Such measurement transducers, including flanges possibly attached thereto, have, in the meantime, grown, at least in individual cases or small-series production, to installed masses of far above 500 kg. However, it must be appreciated that, alone in consideration of the structural situations in the plants, it is necessary that there be limitations to further marked increases in the installed mass of such measurement transducers. Considering also that the installed mass increases more than proportionally to the nominal diameter of the measurement transducer, in order to achieve the high mechanical stability likewise required for measurement transducers of the described kind, it seems that the above-mentioned sizes already represent an upper limit for what is currently economically realizable for vibration-type measurement transducers. In the case of the above-described, conventional forms of construction, a corresponding installed mass to nominal diameter ratio of the total installed mass of the measurement transducer to its nominal diameter, for nominal diameters of less than 150 mm, is usually smaller than 1 kg/mm, while, for nominal diameters of over 150 mm, especially greater than 200 mm, the ratio would lie noticeably above 1.5 kg/mm. Considering that, in the case of measurement transducers of the described form of construction with nominal diameters of greater than 150 mm and with use of the currently usual materials, very high installed mass to nominal diameter ratios are to be expected, it appears that, for vibration-type measurement transducers, an increase of their nominal diameters is scarcely possible any more, without accompanying significant increase of the installed masses.

As a result of the specified limitations respecting maximum installed masses, a special problem exists for the design of measurement transducers of large nominal diameter, that, due to the then compelled very high total mass of the above-mentioned inner oscillation system (mass of the measuring tube itself, mass of the volume fraction of the medium to be measured instantaneously conveyed in the measuring tube, total mass of the exciter mechanism and sensor arrangement, etc.), an outer oscillation system of the measurement transducer, formed at least by the transducer housing, including carrier cylinder, or carrier frame, as the case may be, and possibly provided distributer pieces and/or flanges, must, in comparison to the inner oscillation system, become ever lighter. In other words, such measurement transducers with large nominal diameters must, because of their most often large installed mass, be so designed, that, in comparison with conventional measurement transducers with smaller nominal diameters, a mass ratio of a total mass of the outer oscillation system to a total mass of the inner oscillation system is small.

Investigations have now, however, shown, that, in the case of comparatively small mass ratios (total mass of the outer oscillation system:total mass of the inner oscillation system) of smaller than 4:1, such as can arise due to the above-mentioned limiting to a still-manageable installed mass of the measurement transducer, especially in the case of measurement transducers of large nominal diameter, especially in the case conventionally constructed measurement transducers of a nominal diameter of greater than 200 mm, eigenfrequencies of the outer oscillation system unluckily become shifted quite near to the wanted oscillation frequency or even into the wanted frequency band. As a result of this, the undesired situation can, for example, arise, that the inner oscillation, operating, as it should, at the wanted oscillation frequency, excites the outer oscillation system to resonance oscillations, which then get superimposed on the oscillations of the inner oscillation system and, thus, can significantly influence, or even render completely useless, the oscillation measurement signal delivered by the sensor arrangement. The interfering vibrations are, in such case, caused to a considerable degree by the components of the outer oscillation system, especially the mentioned housing segments, which are made with a wall thickness mostly smaller than 5 mm, thus almost thin-walled, yet being at the same time quite large as regards surface area. For example, the frequency spectrum shown by way of example in FIG. 2 was experimentally determined for an outer oscillation system of form of construction described in WO-A 03/021202 and schematically illustrated in FIGS. 1a, b, including a support tube and a housing cap affixed thereto. Clearly recognizable is that the outer oscillation system exhibits pronounced oscillation modes at about 255 Hz and about 259 Hz, with the above-mentioned, wanted frequency band for the inner oscillation system of the same measurement transducer having been determined to lie in the range of about 210 Hz to 270 Hz. According to this, in the case of the described measurement transducer configuration, the outer oscillation system would resonate over practically the entire wanted frequency band that should actually be kept free of disturbances. Consequently, the oscillation measurement signals determined in such case, especially signals for a mass flow rate measurement or for a density measurement, would be essentially completely unusable.

A possibility for reducing such disturbance oscillations coming from the outer oscillation system is, for instance, as proposed e.g. in WO-A 01/33174, to affix extra masses to the transducer housing, such as resonate essentially with the transducer housing and, therefore, bring about a studied detuning of the outer oscillation system relative to the inner oscillation system. A disadvantage of such a solution is, with reference to the use on measurement transducers of large nominal diameter, that this, in turn, results in a further increasing of the already very large installed mass of the measurement transducer.

SUMMARY OF THE INVENTION

Proceeding from the above-discussed state of the art, an object of the invention is, therefore, to provide a vibration-type measurement transducer, which, especially while largely retaining already established and proven forms of construction, exhibits, even at large nominal diameter, a highest possible measurement accuracy of 99.8% or above and, in such context, a measurement error of less than 0.02%.

For achieving the object, the invention resides in a vibration-type measurement transducer for measuring a flowable medium conveyed in a pipeline, especially a gas, liquid, powder or some other flowable substance. The measurement transducer includes a transducer housing, which exhibits a multiplicity of natural oscillation modes and at least a first measuring tube for conveying at least a volume fraction of the medium to be measured, said tube being held oscillatably in the transducer housing and vibrating, at least at times. Further, the measurement transducer includes an electromechanical, i.e. electrodynamic, exciter mechanism acting on the at least one measuring tube for producing and/or maintaining mechanical oscillations of the at least one measuring tube and a sensor arrangement reacting to movements, i.e. bending oscillations, of the measuring tube, for producing at least one oscillation measurement signal representing oscillations of the measuring tube. In addition, the measurement transducer includes a first support element fixed, i.e. directly, to the transducer housing and serving for the formation of essentially locationally fixed oscillation nodes in the transducer housing for suppressing or erasing at least one natural oscillation mode of the transducer housing. An outer oscillation system of the measurement transducer is formed by the transducer housing and at least the at least one support element and an inner oscillation system of the measurement transducer is formed by the at least one measuring tube, the medium at least instantaneously conveyed therein, and, at least in part, by the exciter mechanism and the sensor arrangement. Further, the inner oscillation system, driven by the exciter mechanism, executes, at least at times during operation of the measurement transducer, mechanical oscillations, especially in the form of lateral oscillations, having at least one wanted oscillation frequency, which is both dependent on size, form and material of the measuring tube as well as also on an instantaneous density of the medium, and which, during operation of the measurement transducer, is variable within a predetermined, wanted, frequency band having lower and upper limit frequencies.

In a first embodiment of the measurement transducer of the invention, the transducer housing and the at least one support element are so formed and so connected mechanically together, that the outer oscillation system of the measurement transducer at least formed thereby, in spite of the oscillations of the measuring tube, executes, at least within the wanted frequency band, no, or possibly only such undesired, disturbance oscillations, of which an instantaneously dissipated, disturbance, oscillation power is substantially smaller than a wanted oscillation power instantaneously dissipated at the wanted oscillation frequency by the oscillations of the inner oscillation system.

In a second embodiment of the measurement transducer of the invention, a wanted-to-disturbance power ratio of the wanted oscillation power to the disturbance oscillation power is at least larger than 2, especially larger than 5. Especially, the disturbance oscillation power corresponds, in such case, to an average value of all oscillation powers instantaneously dissipated within the wanted frequency band by disturbance oscillations.

In a third embodiment of the measurement transducer of the invention, the transducer housing and the at least one support element are so formed and so mechanically connected together, that the outer oscillation system of the measurement transducer formed at least thereby, despite the oscillations of the measuring tube, executes, at least within the wanted frequency band, no or possibly only such undesired disturbance oscillations, of which an instantaneously maximum disturbance oscillation amplitude is significantly smaller than an instantaneously maximum oscillation amplitude of the oscillations of the inner oscillation system, especially the measuring tube itself.

In a fourth embodiment of the measurement transducer of the invention, a wanted-to-disturbance amplitude ratio of the instantaneously maximum oscillation amplitude of the oscillations of the inner oscillation system to the instantaneously maximum disturbance oscillation amplitude is greater than 1.5, especially greater than 2.

In a fifth embodiment of the measurement transducer of the invention, the transducer housing and the at least one support element are so formed and so connected mechanically together that the measurement transducer outer oscillation system at least formed thereby, in spite of the oscillations of the measuring tube, executes, at least within the wanted frequency band, no or possibly only such undesired disturbance oscillations, of which an instantaneous disturbance oscillation quality factor is significantly smaller than an instantaneous wanted oscillation quality factor of the oscillations of the inner oscillation system at the wanted oscillation frequency.

In a sixth embodiment of the measurement transducer of the invention, a wanted-to-disturbance oscillation quality factor ratio of the instantaneous wanted oscillation quality factor to the instantaneous disturbance oscillation quality factor is at least 50:1, especially greater than 80.

In a seventh embodiment of the measurement transducer of the invention, the sensor arrangement includes a first oscillation sensor, especially one arranged on the inlet end of the at least one measuring tube, as well as a second oscillation sensor, especially one arranged on the outlet end of the at least one measuring tube.

In an eighth embodiment of the measurement transducer of the invention, the exciter mechanism includes at least one oscillation exciter, especially one arranged at the half-way point on the at least one measuring tube.

In a ninth embodiment of the measurement transducer of the invention, the transducer housing includes an, especially steel, carrier element, with which the at least one measuring tube is mechanically connected at its inlet and outlet ends. In a further development of this embodiment of the measurement transducer of the invention, the carrier element of the transducer housing is embodied as an, especially essentially tubular, carrier cylinder, with which the at least one measuring tube is mechanically connected at its inlet and outlet ends. In a further development of this embodiment of the measurement transducer of the invention, the carrier element has a mass of at least 70 kg, especially of more than 140 kg, and/or a length of at least 1000 mm, especially of more than 1200 mm.

In a tenth embodiment of the measurement transducer of the invention, the at least one measuring tube has at least one bent tube segment. In a further development of this embodiment of the measurement transducer of the invention, the at least one measuring tube has at least one, essentially U- or V-shaped, tube segment. In another further development of this embodiment of the measurement transducer of the invention, the transducer housing has a housing segment arranged laterally next to the at least one bent tube segment of the at least one measuring tube. Especially, the housing segment extends at least sectionally essentially parallel to the bent tube segment. Further the housing segment may essentially plate-shaped. Advantageously, the transducer housing comprises at least two housing segments being arranged lying opposite to one another in such a manner that the at least one bent tube segment of the at least one measuring tube extends at least sectionally between the two housing segments. In such case, the at least one support element is advantageously affixed at least in part to the housing segments.

In an eleventh embodiment of the measurement transducer of the invention, the at least one support element is formed by means of at least one solid plate, which is connected with the transducer housing at least two mutually opposing attachment locations, for instance by means of bolts and/or at least partially releasably.

In a twelfth embodiment of the measurement transducer of the invention, the at least one support element has a mass of at least 3 kg.

In a thirteenth embodiment of the measurement transducer of the invention, the at least one support element is at least pointwise welded and/or soldered, especially hard soldered or brazed, with the transducer housing.

In a fourteenth embodiment of the measurement transducer of the invention, the at least one support element is at least pointwise screw-connected to the transducer housing.

In a fifteenth embodiment of the measurement transducer of the invention, the at least one support element is at least pointwise affixed to the transducer housing in the region of an oscillation antinode, especially of a local oscillation amplitude, of a natural oscillation mode of the transducer housing.

In a sixteenth embodiment of the measurement transducer of the invention, at least one oscillation-damping inlay is provided coupled to the transducer housing, especially extending at least sectionally between the at least one support element and the transducer housing. In a further development of this embodiment of the invention, the oscillation-damping inlay is made of a plastic, a rubber, a silicone or the like. In another further development of the invention, the inlay extends at least sectionally between the at least one support element and the transducer housing.

In a seventeenth embodiment of the measurement transducer of the invention, this further includes a second support element likewise affixed, especially directly, to the transducer housing, especially a second support element essentially identical to the first support element, for forming essentially locationally fixed oscillation nodes in the transducer housing, with the outer oscillation system of the measurement transducer including, to this extent, at least also the second support element. In a further development of this embodiment of the measurement transducer of the invention, the sensor arrangement includes a first oscillation sensor, especially a first oscillation sensor arranged on the inlet end of the at least one measuring tube, as well as a second oscillation sensor, especially one arranged on the outlet end of the at least one measuring tube, and the first support element is affixed to the transducer housing at least partially in the vicinity of the first oscillation sensor and the second support element at least in part in the vicinity of the second oscillation sensor.

In an eighteenth embodiment of the measurement transducer of the invention, it additionally has a third support element likewise affixed, especially directly, to the transducer housing for forming essentially locationally fixed, oscillation nodes in the transducer housing, with the outer oscillation system of the measurement transducer, to such extent, including at least also the third support element. In a further development of this embodiment of the measurement transducer of the invention, the exciter mechanism includes at least one oscillation exciter, especially an exciter arranged at the halfway point on the at least one measuring tube, and the third support element is at least in part affixed to the transducer housing in the vicinity of the oscillation exciter.

In a nineteenth embodiment of the measurement transducer of the invention, it additionally has at the inlet end a first connection flange, as well as at the outlet end a second connection flange, for the connecting of the measurement transducer to the pipeline, with the outer oscillation system of the measurement transducer, to such extent, including also at least the first and second connection flanges. In a further development of this embodiment of the measurement transducer of the invention, each of the two connection flanges has, in such case, a mass of more than 50 kg, especially more than 60 kg.

In a twentieth embodiment of the measurement transducer of the invention, it includes further a second measuring tube essentially identical to the first measuring tube and/or extending essentially parallel to the first measuring tube. In a further development of this embodiment of the measurement transducer of the invention, it has, additionally, at least a first node plate connecting the first and second measuring tubes together at their inlet ends, as well as at least a second node plate connecting the first and the second measuring tubes together at their outlet ends, with the inner oscillation system of the measurement transducer including, to such extent, at least also the first and the second node plates. In another further development of the measurement transducer of the invention, it further includes a first manifold connecting the first and second measuring tubes together at their inlet ends, as well as a second manifold connecting the first and second measuring tubes together at their outlet ends, with the outer oscillation system of the measurement transducer, to such extend, including at least also the first and second manifolds. Especially, each of the two manifolds has, in such case, a mass of more than 10 kg, especially of more than 20 kg.

In a twenty-first embodiment of the measurement transducer of the invention, the instantaneous wanted oscillation frequency corresponds essentially to an instantaneous, natural eigenfrequency of the inner oscillation system.

In a twenty-second embodiment of the measurement transducer of the invention, the outer oscillation system of the measurement transducer has at least one oscillation mode with a lowest, natural eigenfrequency, which is smaller than the lower limit frequency of the wanted frequency band.

In a twenty-third embodiment of the measurement transducer of the invention, the inner oscillation system has at least one oscillation mode with a natural eigenfrequency, which is, during operation, always greater than the lowest natural eigenfrequency of the outer oscillation system.

In a twenty-fourth embodiment of the measurement transducer of the invention, the outer oscillation, system has at least one oscillation mode with a natural eigenfrequency, which is smaller than the upper limit frequency of the wanted frequency band and which is larger than the lower limit frequency of the wanted frequency band.

In a twenty-fifth embodiment of the measurement transducer of the invention, the upper limit frequency of the wanted frequency band is determined for the condition that the density of the medium is essentially zero, especially about equal to a density of air.

In a twenty-sixth embodiment of the measurement transducer of the invention, the lower limit frequency of the wanted frequency band is determined for the condition that the density of the medium is greater than 400 kg/m$^3$.

In a twenty-seventh embodiment of the measurement transducer of the invention, the lower limit frequency of the wanted frequency band is determined for the condition that the density of the medium is less than 2000 kg/m$^3$.

In a twenty-eighth embodiment of the measurement transducer of the invention, the upper limit frequency of the wanted frequency band is determined for the condition that a viscosity of the medium is smaller than $100 \cdot 10^{-6}$ Pas, especially about equal to a viscosity of air.

In a twenty-ninth embodiment of the measurement transducer of the invention, the lower limit frequency of the wanted frequency band is determined for the condition that a viscosity of the medium is greater than $300 \cdot 10^{-6}$ Pas.

In a thirtieth embodiment of the measurement transducer of the invention, the lower limit frequency of the wanted frequency band is determined for the condition that a viscosity of the medium is less than $3000 \cdot 10^{-6}$ Pas.

In a thirty-first embodiment of the measurement transducer of the invention, the wanted frequency band has a band width of at least 20 Hz, especially more than 50 Hz.

In a thirty-second embodiment of the measurement transducer of the invention, the at least one measuring tube and the transducer housing are comprised of steel, especially high grade and/or stainless steel.

In a thirty-third embodiment of the measurement transducer of the invention, the at least one measuring tube has a mass of at least 10 kg, especially greater than 25 kg.

In a thirty-fourth embodiment of the measurement transducer of the invention, the measuring tube has an inner diameter of at least 80 mm, especially greater than 100 mm.

In a thirty-fifth embodiment of the measurement transducer of the invention, the measuring tube has a stretched length of at least 1000 mm, especially greater than 1500 mm.

In a thirty-sixth embodiment of the measurement transducer of the invention, the transducer housing has a mass of at least 80 kg, especially more than 160 kg.

In a thirty-seventh embodiment of the measurement transducer of the invention, the transducer housing has a minimum wall thickness of less than 6 mm.

In a thirty-eighth embodiment of the measurement transducer of the invention, a total mass of the inner oscillation system amounts to at least 70 kg. In a further development of this embodiment of the measurement transducer of the invention, the total mass, during operation, is, at least at times, greater than 90 kg.

In a thirty-ninth embodiment of the measurement transducer of the invention, a total mass of the outer oscillation system amounts to at least 200 kg. In a further development of this embodiment of the measurement transducer of the invention, the total mass is greater than 300 kg.

In a fortieth embodiment of the measurement transducer of the invention, a mass ratio of a total mass of the outer oscillation system to a total mass of the inner oscillation system is, during operation, at least at times, smaller than 3, especially smaller than 2.5. In a further development of this embodiment of the measurement transducer of the invention, the mass ratio of the total mass of the outer oscillation system to the total mass of the inner oscillation system is continuously smaller than 3.

In a forty-first embodiment of the measurement transducer of the invention, an installed mass to nominal diameter ratio of an installed mass of the total measurement transducer to a nominal diameter of the measurement transducer corresponding to a caliber of the pipeline, in whose course the measurement transducer is to be inserted, amounts to greater than 2 kg/mm.

In a forty-second embodiment of the measurement transducer of the invention, the installed mass of the total measurement transducer is greater than 200 kg, especially greater than 400 kg.

In a first variant of this embodiment of the invention, the at least one measuring tube has a bent tube segment, and the carrier element is embodied as a laterally, at least partially open, especially tubular, carrier cylinder, which is so connected with the at least one measuring tube that the at least one bent tube segment protrudes laterally out of the carrier cylinder. Furthermore, the transducer housing includes a housing cap affixed, especially permanently and/or medium-tightly, to the carrier element and arranged spaced from the at least one measuring tube, for housing the at least one, bent tube segment of the measuring tube.

In a first embodiment of the first variant of the measurement transducer of the invention, the housing cap has a mass of at least 10 kg, especially more than 20 kg.

In a second embodiment of the first variant of the measurement transducer of the invention, the at least one support element is affixed partly to the housing cap and partly to the carrier cylinder.

In a third embodiment of the first variant of the measurement transducer of the invention, the at least one support element is formed by means of at least one solid plate, which is affixed at least pointwise, especially at least partly releasably and/or at least pointwise bonded, both to the housing cap and to the carrier cylinder.

In a fourth embodiment of the first variant of the measurement transducer of the invention, the housing cap includes housing segments, which arranged laterally beside the at least one bent tube segment of the at least one measuring tube, especially extending at least sectionally essentially parallel to the bent tube segment and/or being essentially plate-shaped, with there being preferably at least two housing segments arranged opposed to one another in such a manner that the at least one bent tube segment of the at least one measuring tube extends at least sectionally between the two housing segments. In a further development of this embodiment of the first variant, the housing cap includes a trough-shaped, first housing segment having a circular-arc-shaped, first segment edge of predeterminable radius and having a second segment edge formed essentially identically to the first segment edge, with the first housing segment having a circular-arc-shaped cross section with a radius, which is smaller than the radius of the first segment edge.

Furthermore, the housing cap includes an essentially planar, second housing segment, which is connected via a circular-arc-shaped, first segment edge with the first segment edge of the first housing segment, as well as a third housing segment essentially mirror symmetrical to the second housing segment and connected via a circular-arc-shaped, first segment edge with the second segment edge of the first housing segment, with the second and third housing segments preferably lying each in a tangential plane of the first housing segment.

In a second variant of the measurement transducer of the invention, the transducer housing includes: A carrier frame, which is so connected mechanically with the at least one measuring tube at its inlet and outlet ends, that the at least one bent tube segment extends within the carrier frame; a first housing segment, which is arranged laterally beside the at least one bent tube segment of the at least one measuring tube, especially extending at least sectionally essentially parallel to the bent tube segment and/or essentially plate-shaped and which is affixed to the carrier frame, especially permanently and/or medium-tightly; as well as a second hosing segment, which is arranged beside the at least one bent tube segment of the at least one measuring tube, especially at least sectionally extending essentially parallel to the bent tube segment and/or essentially plate-shaped, and which is affixed to the carrier frame, especially permanently and/or medium tightly. Furthermore, the two housing segments are arranged in this second variant in such a manner lying opposite to one another, that the at least one bent tube segment of the at least one measuring tube extends at least sectionally between the two housing segments.

A basic idea of the invention is use of the additional support elements to construct the outer oscillation system, thus those components of the measurement transducer whose mechanical oscillations in the operation of the measurement transducer are, if anything, undesired and, are, to such extent, possibly disturbance oscillations, such that the outer oscillation system acts as a band-blocking filter, at least for those oscillation frequencies which would lie within the wanted frequency band, which, in turn, is a band predominantly dependent on the characteristics of the inner oscillation system. In other words, by the studied de-tuning of the outer oscillation system with respect to the inner oscillation system by means of the support elements, a blocked frequency band is created barring potential disturbance oscillations. Within the blocked frequency band, possible disturbance oscillations of the outer oscillation system are at least effectively suppressed. The invention rests, in such case, among other things, on the recognition that the potential disturbance oscillations in the range of the wanted frequency band are predominantly determined by the oscillation characteristics of the, if anything, thin-walled and very large-surfaced housing segments, and that an especially effective removal of disturbance of the measurement transducer can occur by suitable positioning of the support elements, even after placement of just a few of such additional, resulting fixation points in the transducer housing and thus with the addition of only a relatively slight, added mass.

An advantage of the invention is that, already by the use of some few support elements serving, in principle, to increase a bending stiffness of the housing segments and, to such extent, without large added complexity in comparison to conventional measurement transducers, a wanted frequency band, or a blocked frequency band for potential interfering oscillations, can be realized, which, for the practical operation of measurement transducers with a critical installed mass to nominal diameter ratio of greater than 1.5 kg/mm, especially larger than 2 kg/mm, and/or a critical mass ratio of the total mass of the outer oscillation system to the total mass of the inner oscillation system of smaller than 4, especially smaller than 3, is largely kept free of disturbance oscillations over a sufficiently wide frequency range. To such extent, a further advantage of the invention is that an opportunity is created whereby vibration-type measurement transducers also with large nominal diameters of over 150 mm, especially with a nominal diameter of greater than 200 mm, can, on the one hand, be realized on an economically sensible basis, and, on the other hand, the installed masses are still manageable. A further advantage of the invention is that, in such case, also already established and proven forms of construction can largely be retained.

The measurement transducer of the invention is, therefore, suited especially for the measurement of flowable media conveyed in a pipeline having a caliber of greater than 150 mm, especially of 250 mm or above. Additionally, the measurement transducer is also suited for the measurement of mass flow rates, which are, at least at times, greater than 900 t/h, especially, at least at times, greater than 1200 t/h, such as can arise e.g. in the case of applications involving the measurement of petroleum, natural gas or other petrochemical substances.

The invention will now be explained in greater detail on the basis of examples of embodiments and the figures of the drawing. Functionally equal parts are provided in the separate figures with the same reference characters, which, however, are only repeated in subsequent figures when such appears useful.

BRIEF DESCRIPTION OF THE DRAWINGS

FIGS. 1a, b show, in different side views, a conventional, inline measuring device, for example one serving as a Coriolis flow/density/viscosity meter, based on a vibration-type measurement transducer;

FIG. 2 shows an experimentally determined spectrum of mechanical eigenfrequencies of a vibration-type measurement transducer used for an inline measuring device according to FIGS. 1a, b;

FIGS. 9 to 11 show, in different, sectional, side views, details of a second variant of a vibration-type measurement transducer suited for an inline measuring device of FIGS. 3a, b.

DETAILED DESCRIPTION OF EXEMPLARY EMBODIMENTS

Figure 3:
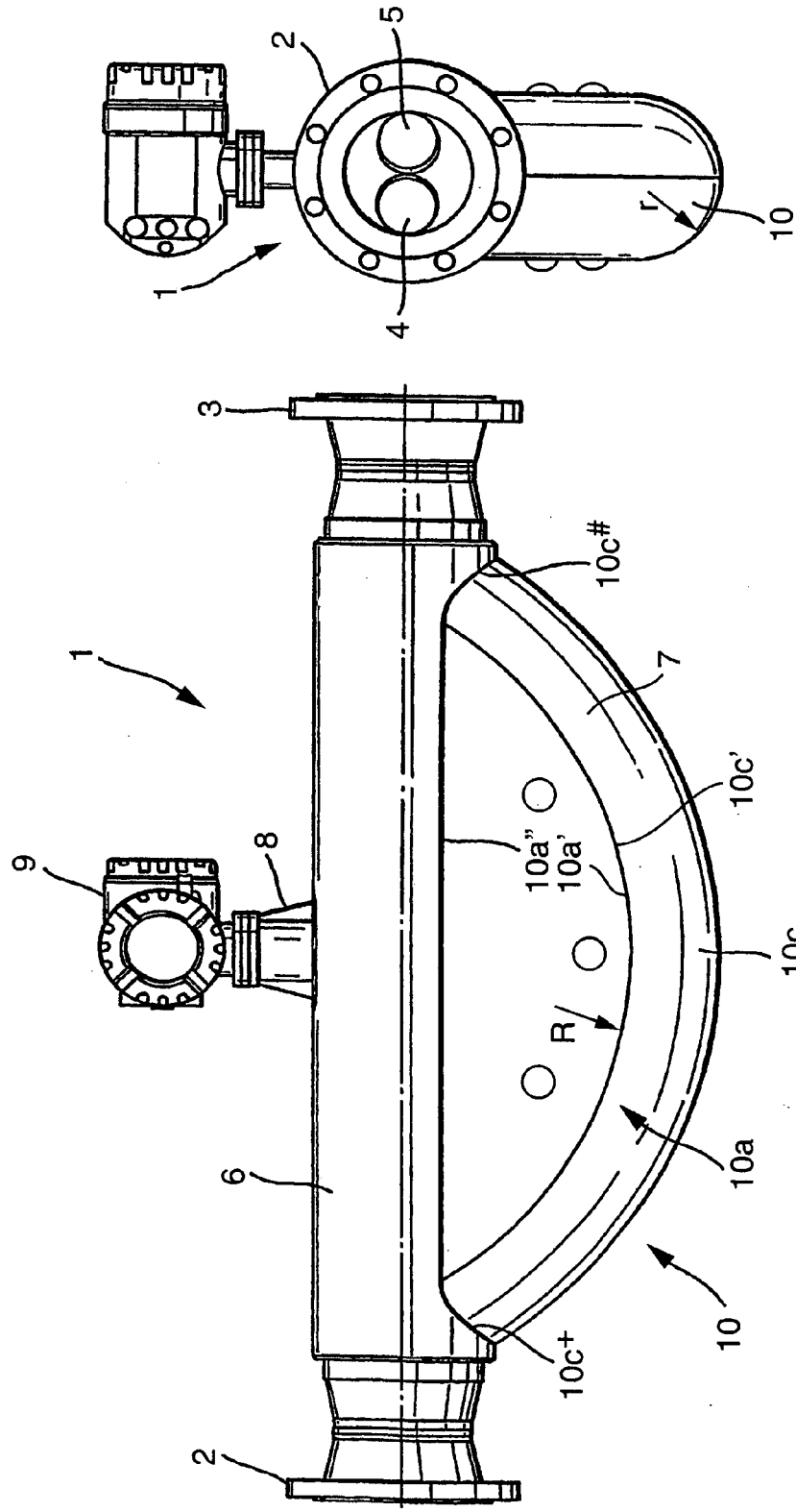
FIGS. 3a, b show, in different side views, an inline measuring device serving as a flow/density/viscosity meter based on an improved vibration-type measurement transducer.

While the invention is susceptible to various modifications and alternative forms, exemplary embodiments thereof have been shown by way of example in the drawings and will herein be described in detail. It should be understood, however, that there is no intent to limit the invention to the particular forms diclosed, but on the contrary, the intention is to cover all modifications, equivalents, and alternatives falling within the spirit and scope of the invention as defined by the intended claims.

FIGS. 3a, b show an inline measuring device 1, especially one embodied as a Coriolis mass flow rate and/or density measuring device, which serves for registering a mass flow rate m of a medium flowing in a pipeline (not shown) and for reflecting such in a mass flow rate measured value $X_m$ instantaneously representing this mass flow rate. The medium can be practically any flowable substance, especially a powder, liquid, gas, vapor or the like. Alternatively or in supplementation, the inline measuring device 1 can, as required, also be used to measure a density $\rho$ and/or a viscosity $\eta$ of the medium. The measurement transducer is especially intended for measuring media, such as e.g. petroleum, natural gas or other petrochemical substances, which flow in a pipeline having a caliber of greater than 150 mm, especially a caliber of 250 mm or above, and/or which have, at least at times, a mass flow rate of greater than 900 t(metric)/h, especially of greater than 1200 t/h. The inline measuring device 1 includes therefor a vibration-type measurement transducer 10, through which the medium to be measured flows during operation, as well as a measuring device electronics 20 electrically connected with the measurement transducer 10. The measuring device electronics 20 is not shown here in detail, but, instead, is indicated only schematically as a block.

Advantageously, the measuring device electronics 20 is so constructed that it can exchange measurement and/or other operating data with a measured-value processing unit superordinated to it, for example a programmable logic controller (PLC), a personal computer and/or a work station, via a data transfer system, for example a fieldbus system. Additionally, the measuring device electronics is so constructed that it can be fed from an external energy, or power, supply, for example also over the above-mentioned fieldbus system. For the case that the inline measuring device has provision for connecting to a fieldbus or another communication system, the, especially programmable, measuring device electronics has, additionally, an appropriate communication interface for communicating data, e.g. for transmitting the measurement data to the already mentioned programmable logic controller or to a superordinated, process control system.

Figure 9:
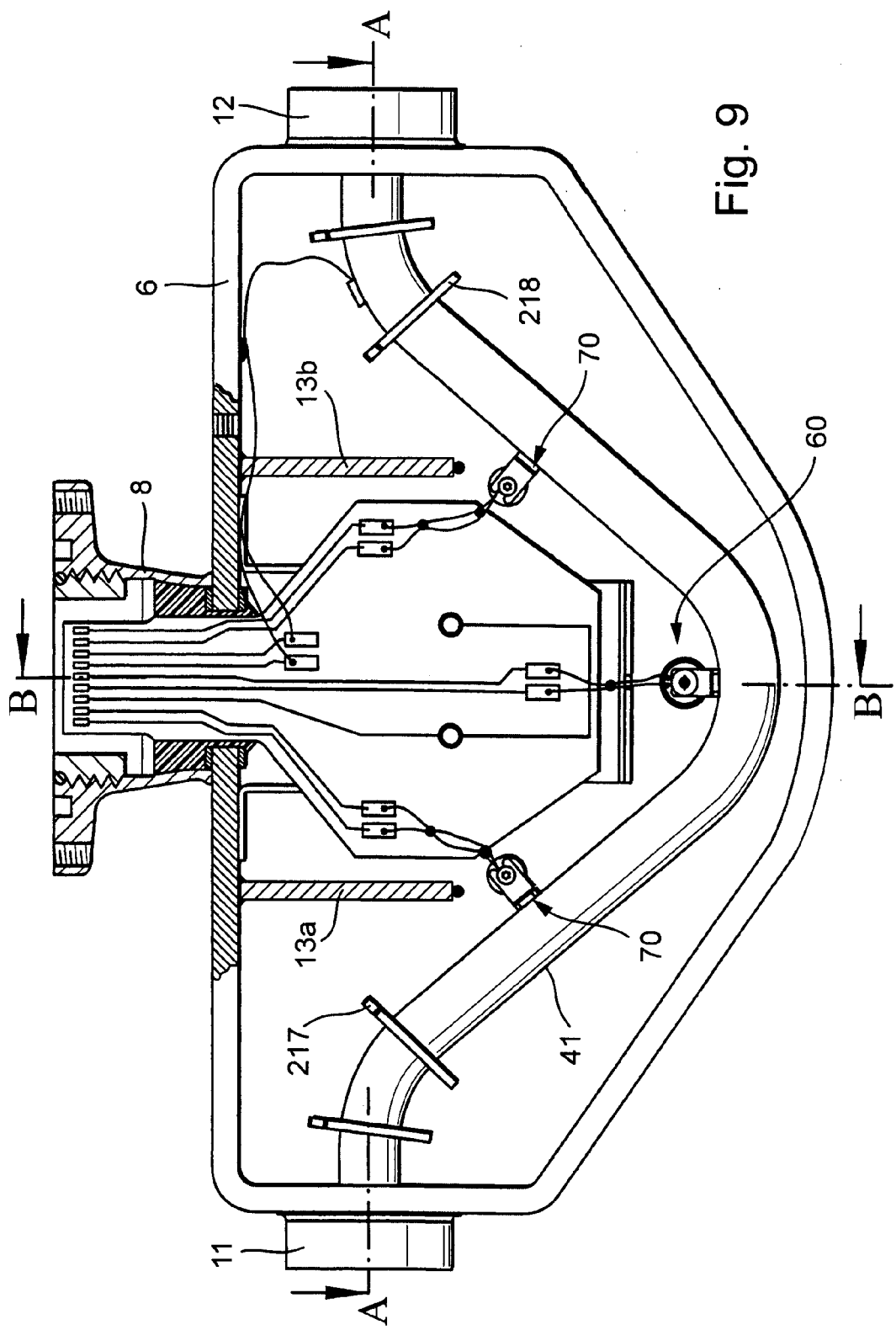

FIGS. 4 to 7 show, in various views, an example of an embodiment of a first variant of the measurement transducer 1 serving especially as a Coriolis mass flow rate, density and/or viscosity meter, while FIGS. 9 to 11 illustrate an example of an embodiment for a second variant of such a measurement transducer. As already indicated, the measurement transducer serves for producing such mechanical reaction forces, especially Coriolis forces dependent on mass flow rate, inertial forces dependent on the density of the medium and/or frictional forces dependent on the viscosity of the medium. These forces react measurably, especially in a manner registerable by sensor, on the measurement transducer. Based on these reaction forces describing the medium, e.g. mass flow rate, density and/or viscosity of the medium can be measured, in manner know to those skilled in the art, by means of evaluation methods appropriately implemented in the measuring device electronics. Measurement transducer 1 is inserted, during operation, into the course of a pipeline (not shown) using flanges 2, 3. The medium to be measured, especially a powdered, liquid, gaseous or vaporous medium, flows through the pipeline. Instead of using flanges, the measurement transducer 1 can also be connected into the mentioned pipeline using other known means, such as e.g. triclamp connectors or threaded connections.

For conveying a volume fraction of the medium to be measured, the measurement transducer includes at least a first measuring tube 4 serving as a measuring tube and held oscillatably in a transducer housing 10. In operation, tube 4 is in communication with the pipeline and is caused to vibrate, at least at times, in at least one oscillation mode suited for determining the physical, measured variable. Besides the transducer housing 10 and the at least one measuring tube 4 held therein, the measurement transducer 1 includes an electromechanical, especially electrodynamic, exciter mechanism 60 acting on the at least one measuring tube 4 for producing and/or maintaining mechanical oscillations, as well as a sensor arrangement 70 reacting to mechanical oscillations, especially bending oscillations, of the measuring tube 4 for producing at least one oscillation measurement signal $s_{vb}$ representing oscillations of the measuring tube 4. At least the measuring tube, as well as components additionally affixed thereto, such as e.g. part of the exciter mechanism 60 and part of the sensor arrangement 70, thus form, essentially, an inner oscillation system of the measurement transducer.

Figure 4:
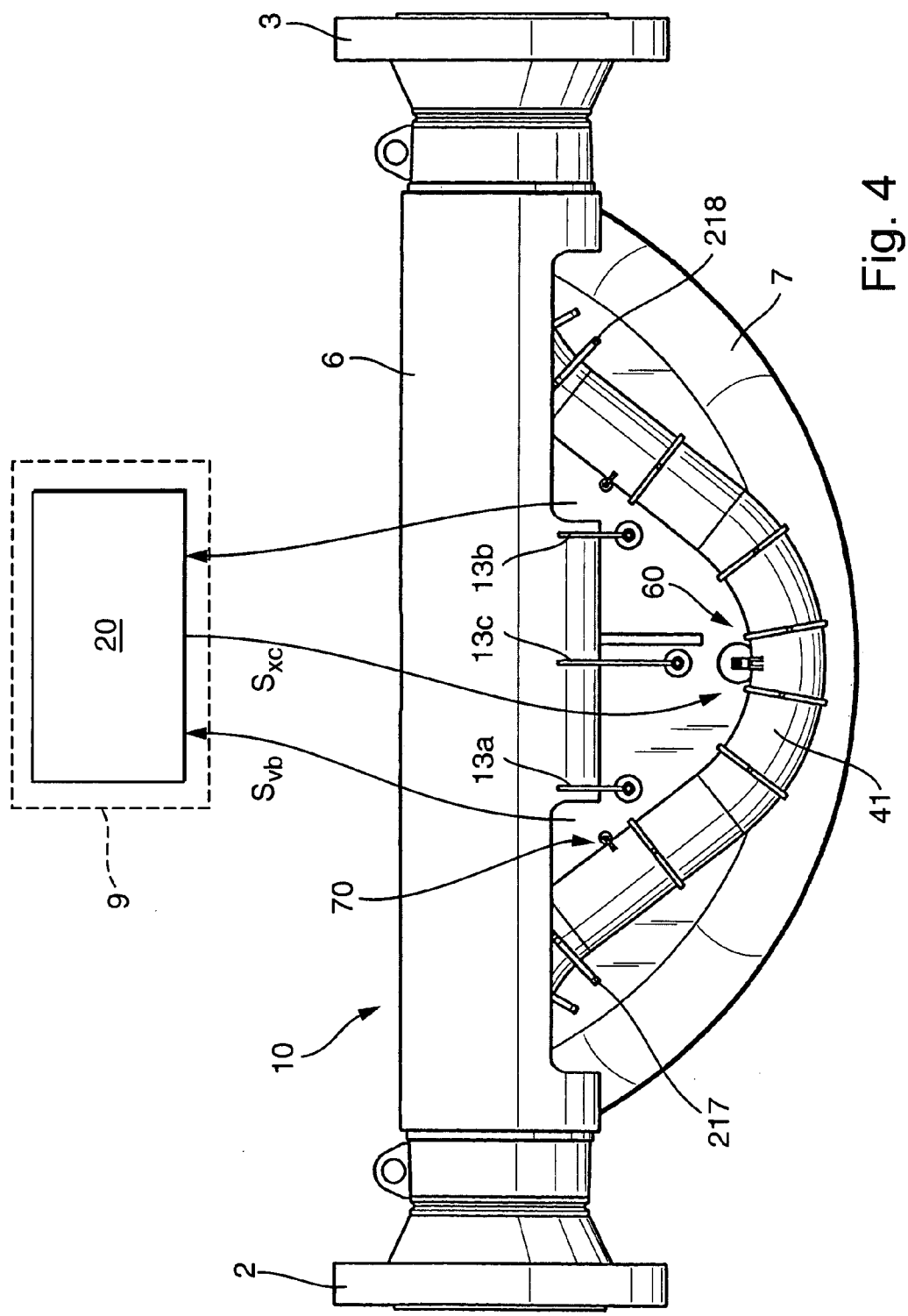
FIGS. 4 to 7 show, in different, partially sectional, side views, details of a first variant of a vibration-type measurement transducer suited for an inline measuring device of FIGS. 3a, b.
Figure 5:
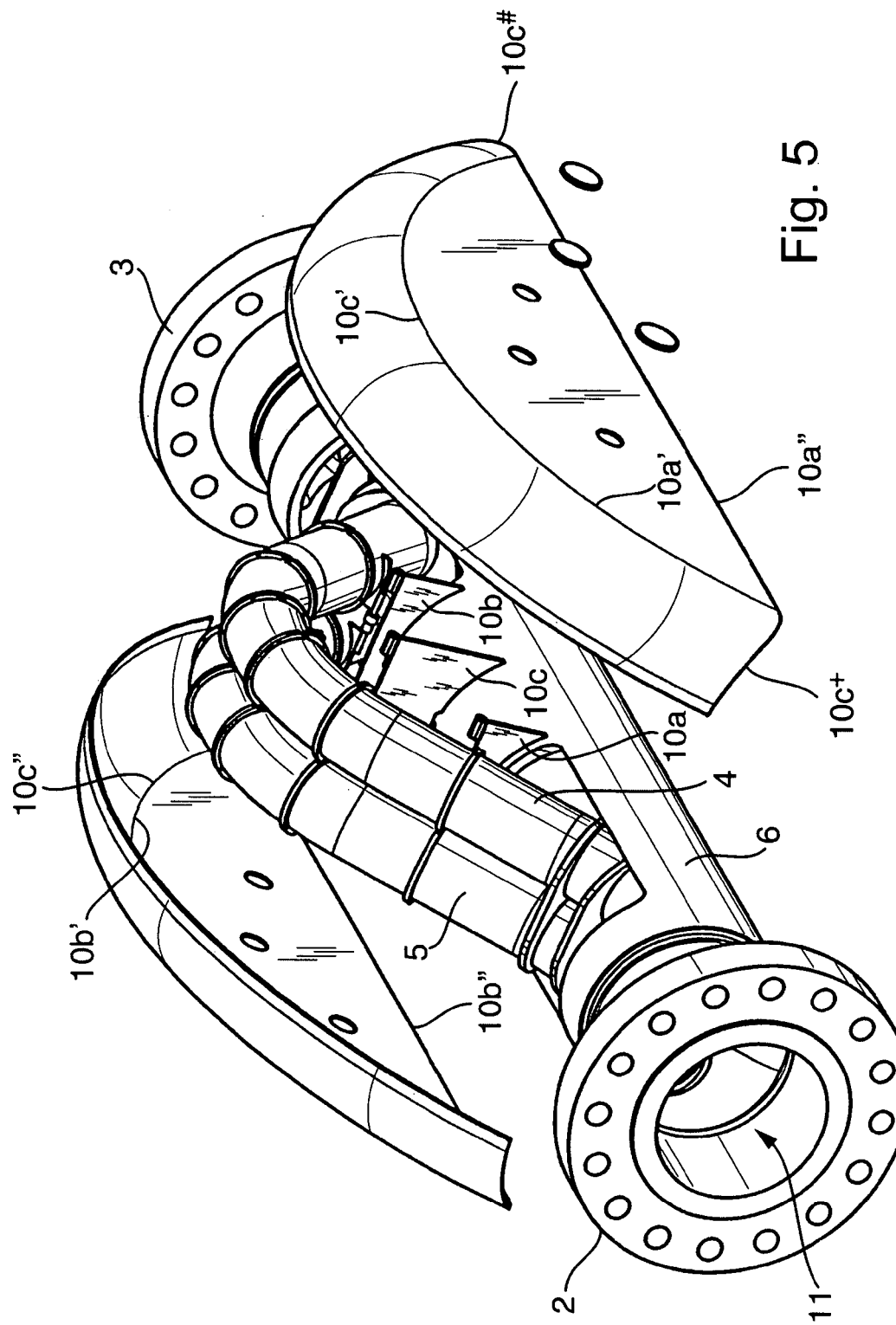
Figure 6:
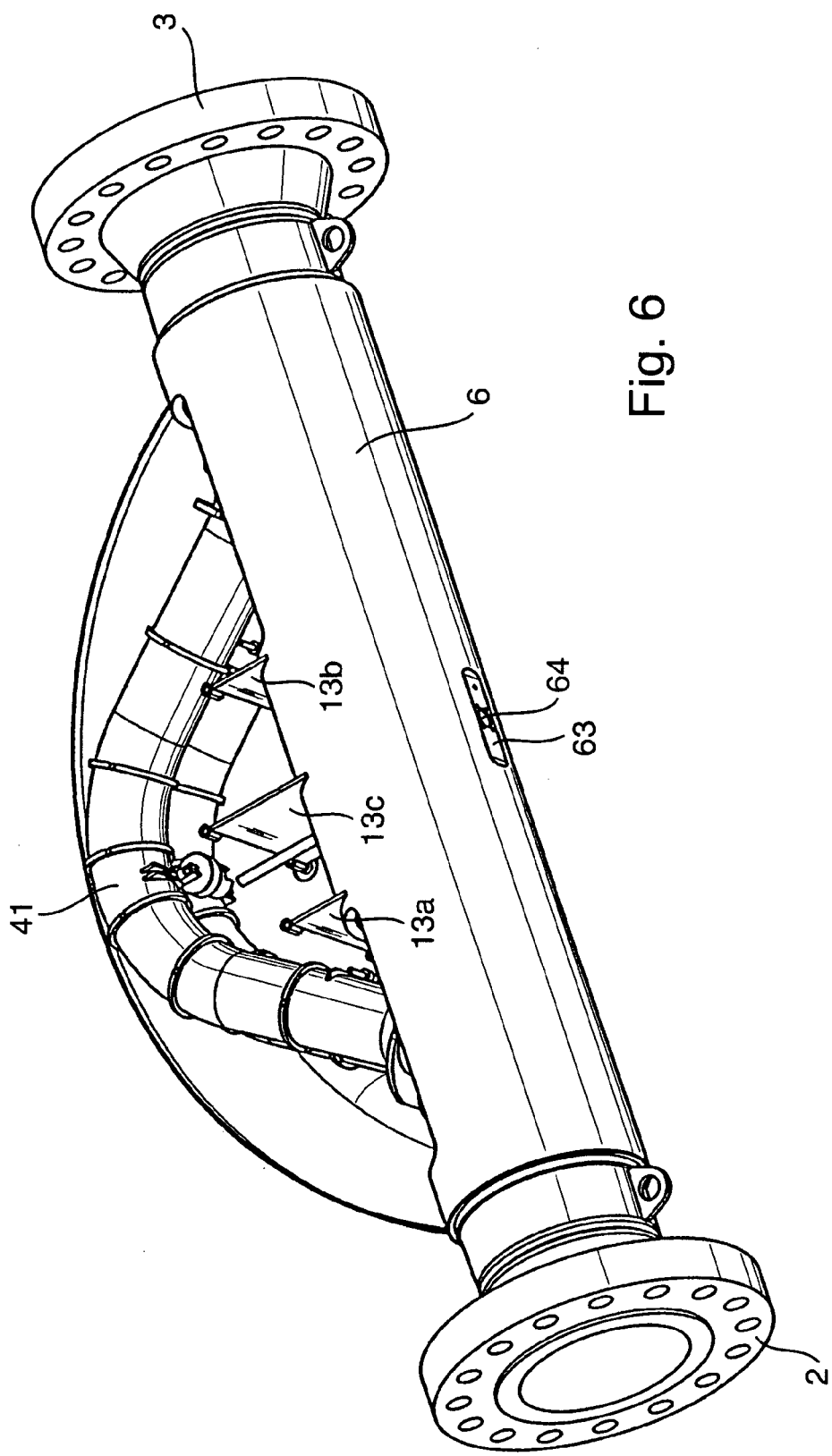
Figure 7:
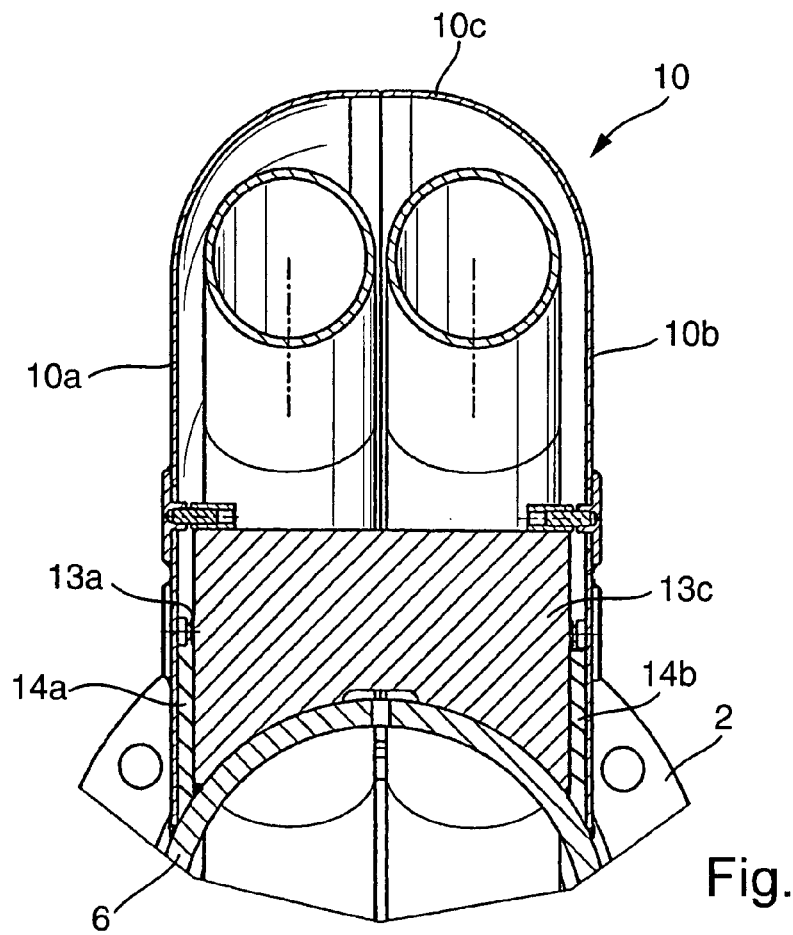

For determining the at least one physical, measured variable on the basis of the at least one oscillation measurement signal, the exciter mechanism 60 and the sensor arrangement 70 are, additionally, as usual for such measurement transducers, coupled in suitable manner, for example galvanically and/or opto-electronically, with a measuring and operating circuit appropriately provided in the measuring device electronics 20. The measuring and operating circuit, in turn, produces, on the one hand, an exciter signal $s_{xc}$ controlled, for example, with respect to an exciter current and/or an exciter voltage, and appropriately driving the exciter mechanism 60. On the other hand, the measuring and operating circuit receives the at least one oscillation measurement signal $s_{vb}$ of the sensor arrangement 70 and generates therefrom desired measured values, which, for example, can represent a mass flow rate, a density and/or a viscosity of the medium to be measured and which can be displayed, if required, on site or also, as required, further processed at a higher level. The measuring device electronics 20, including the measuring and operating circuit, can, for example, be accommodated in a separate electronics housing 9, which is arranged removed from the measurement transducer or, for forming a single, compact device, affixed directly on the measurement transducer 1, for example externally on the transducer housing 10. In the case of the example of an embodiment shown in FIG. 1, therefore, a neck-like transition piece 8 is provided on the transducer housing to serve for holding the electronics housing 9. In FIGS. 4 to 6, however, the transition piece 8 and the electronics housing 9 have been omitted; only in FIG. 6 can a recessed seating surface 63 be seen in a wall of the transducer housing 10 for the transition piece 8. In the seating surface 63, an electric feed-through 64 is arranged, by means of which electric connections for the exciter mechanism 60 and for the sensor arrangement 70, as well as for possible other electric components, such as e.g. pressure and/or temperature sensors possibly present in measurement transducer 1.

The measurement transducer 1 includes, as already indicated, at least one measuring tube 4 serving as measuring tube, with the at least one measuring tube 4 having, in an advantageous embodiment of the invention, at least one tube segment 41 bent at least sectionally in at least one plane. The measuring tube 4 can, in such case, exhibit, for example, a distinct U-shape, such as is also shown in U.S. Pat. No. 6,776,052, or, as shown in FIGS. 4–6, and also proposed in U.S. Pat. Nos. 6,802,224 or 6,711,958, it can be embodied in an essentially V-shape. Additionally, the measuring tube can, however, also, as e.g. described in U.S. Pat. No. 5,796,011, be bent only slightly rectangularly or trapezoidally, or, as shown e.g. in WO-A 01/65213, U.S. Pat. Nos. 6,308,580, 5,301,557, 6,092,429, or 6,044,715, be bent distinctly rectangularly or trapezoidally. Suited as material for the measuring tube are, especially, steel, especially high-grade and/or stainless steel, titanium zirconium or tantalum. Moreover, however, practically any other material usually used, or at least suited, therefor can serve as material for the at least one measuring tube.

As already mentioned, the measurement transducer 1 is provided especially for measurements also of high mass flow rates in a pipeline of large caliber. Due to this, a further embodiment of the measurement transducer 1 provides that the at least one measuring tube 4 has an inner diameter which amounts at least to 80 mm. Especially, the at least one measuring tube 4 is so embodied that its inner diameter is greater than 100 mm, especially also greater than 110 mm. Further, the at least one measuring tube 4 is so dimensioned in another embodiment that it has a stretched length of at least 1000 mm. Especially, the measuring tube is, in such case, so designed that its stretched length is greater than 1500 mm. In line with this, at least for the case in which the at least one measuring tube 4 is made of steel, a mass of at least 10 kg results for the tube 4 in the case of the usual wall thicknesses of somewhat more than 1 mm. In a further embodiment of the invention, the at least one measuring tube is, however, so dimensioned that it exhibits a mass of more than 25 kg, due to a comparatively large wall thickness of about 5 mm and/or a comparatively large stretched length of about 2000 mm.

Besides measuring tube 4, it is further possible, as also shown in FIGS. 5 and 6, to provide a second measuring tube 5 in the measurement transducer. Especially, tube 5 is essentially identical to the first measuring tube 4 and likewise serves to convey at least a volume fraction of the medium to be measured. In a further embodiment of the invention, the second measuring tube 5 likewise has at least one bent tube segment 51. The two measuring tubes, especially in the case in which they extend at least sectionally in parallel with one another, as indicated in FIGS. 5, 9 and 11, and shown, for example, also in U.S. Pat. Nos. 6,711,958, 5,796,011, and 5,301,557, can be connected together by means of appropriate distributer pieces 11, 12 on their inlet and outlet ends to form flow paths flowed-through in parallel during operation; they can, however, also, as shown e.g. in U.S. Pat. No. 6,044,715, be connected serially together to form flow paths lying one after the other. Moreover, it is, however, also possible, as, for example, also proposed in U.S. Pat. Nos. 6,666,098 or 5,549,009, to use only one of the two measuring tubes as measuring tube for conveying the medium and the other as a blind tube not containing medium to be measured flowing through it and, instead, serving for reducing intrinsic imbalances in the measurement transducer.

In case required, mechanical stresses and/or vibrations caused possibly or at least potentially by the transducer housing at the inlet and outlet ends on the vibrating measuring tubes can be minimized e.g. by connecting the measuring tubes mechanically together, as is usual in the case of measurement transducers of the described kind, at the inlet end by means of at least a first node plate 217 and at the outlet end by means of at least a second node plate 218. Moreover, mechanical eigenfrequencies of the two measuring tubes 4, 5 and, thus, also mechanical eigenfrequencies of the inner oscillation system, can be influenced intentionally by means of the node plates 217, 218, be it through their dimensions and/or their positioning.

Considering that, as already mentioned, each of the measuring tubes 4, 5 weighs easily far beyond 10 kg and, in such case, as evident without more from the above dimensional details, can have a capacity of 10 l or more, the inner oscillation system including the two measuring tubes 4, 5 can reach a total mass of far above 50 kg, at least in the case of a medium of high density flowing therethrough. Especially in the case of use of measuring tubes with comparatively large inner diameter, large wall thickness and large stretched length, the mass of the inner oscillation system can amount to, without more, figures greater than 70 kg or, at least with medium flowing therethrough, more than 90 kg.

In the case of the illustrated example of an embodiment, the two measuring tubes 4, 5 are excited by the electromechanical exciter mechanism 60, affixed at least in part thereto, to cantilever-type vibrations, preferably to an instantaneous, mechanical eigenfrequency of the inner oscillation system formed by means of the two measuring tubes 4, 5. In such case, measuring tubes 4, 5 are deflected laterally out of the above-mentioned plane and caused to oscillate in the manner of a tuning fork essentially with mutually opposite phase. Said differently, the tube segments 41, 51 oscillate in a bending oscillation mode in the manner of cantilevers clamped at one end. In the illustrated example of an embodiment, the exciter mechanism 60 has for this purpose an oscillation exciter arranged in the case of each measuring tube 4, 5 in the area of its vertex, about at the half-length point. The oscillation exciter can be, for example, an electrodynamic type exciter, thus an oscillation exciter implemented by means of a magnet coil 62 affixed to the measuring tube 5 and an armature 61 correspondingly affixed to the other measuring tube 4 for plunging movement in the coil 62.

For registering vibrations of the measuring tube and for producing the at least one oscillation measurement signal representing oscillations of the measuring tube, there is further provided, as already mentioned, a sensor arrangement, by means of which, vibrations, especially inlet end, and outlet end, vibrations of the tube segment 41 can be signalized and sent to a further electronic processing. In the illustrated example of an embodiment, the sensor arrangement has for this purpose a first oscillation sensor arranged at the inlet end of the at least one measuring tube 4, and a second oscillation sensor, especially one essentially identical, or of equal construction, to the first oscillation sensor, arranged on the outlet end of the at least one measuring tube. The oscillation sensors can likewise be sensors of electrodynamic type, thus oscillation sensors implemented, in each case, by means of a magnet coil 72, 82 affixed to the measuring tube 5 and an armature 71, 81 correspondingly affixed to the other measuring tube 4 for plunging motion into the opposing magnet coil. Besides this, other oscillation sensors known to those skilled in the art, for instance opto-electronic oscillation sensors, can be used as the oscillation sensors.

The at least one measuring tube 4 of the measurement transducer is, as is clear from the combination of FIGS. 3a, b and 5, and as is also usual in the case of measurement transducers of such type, essentially completely encased by the transducer housing 10. The transducer housing 10 serves not only for holding the measuring tube 4, 5, but also for protecting the internal components of the measurement transducer 1, such as, for example, the exciter mechanism and the sensor arrangement, and components of the measurement transducer placed within the transducer housing, from external, environmental influences, such as e.g. dust or water spray. Beyond this, the transducer housing 10 can additionally be so embodied and dimensioned that it can retain escaping medium, as completely as possible, within the transducer housing, up to a required maximum excess pressure, in the case of possible damage to the at least one measuring tube 4, e.g. by cracking or bursting. The material for the transducer housing, especially the housing cap 7, can be e.g. steel, such as structural steel or stainless steel, or also other suitable, high-strength materials. In another embodiment of the measurement transducer, the at least one measuring tube 4, especially one at least sectionally curved, and the transducer housing are made of the same material, especially steel or high-grade and/or stainless steel, or at least of materials similar to one another, especially various types of steel. Additionally, it is provided that the flanges, as shown also in FIGS. 3a, b and as is quite usual in the case of measurement transducers of this type, are formed as integral components of the transducer housing, in order, in this way, to achieve shortest possible installed length, coupled with highest possible stability of the measurement transducer; in the same way, possibly provided manifolds 11, 12 can also be directly integrated into the transducer housing.

In a first variant of the measurement transducer, the transducer housing 10 includes a carrier element 6 illustrated here as a laterally at least partially open, carrier cylinder, which, as shown in FIGS. 3 and 4, is so mechanically connected with the at least one measuring tube at the inlet and outlet ends, that the at least one bent tube segment 41 protrudes laterally outwards from the carrier cylinder. Furthermore, the transducer housing has a housing cap 7, arranged spaced at least from the bent tube segment of the measuring tube 4 and affixed to the carrier element 6, especially lastingly and/or medium-tightly, for housing at least the at least one bent tube segment of the at least one measuring tube 4. In the case of the example of an embodiment illustrated in FIG. 3, the measuring tube 4 is so held in the, here, tubular carrier element 6 at the inlet and outlet ends, that the oscillatable tube segment 41, extending through two cutouts 61, 62 of the carrier element, protrudes laterally outwards and, consequently, into the housing cap 7 likewise affixed to the carrier element 6. It is also to be mentioned here, in this connection, that, instead of the essentially tubular carrier element 6 illustrated in FIGS. 3 and 4, also an, as required, solid carrier cylinder with another suitable cross section can be used, for example a carrier element more in the shape of a beam.

Depending on which form and stretched length is actually selected for the at least one measuring tube 4, the, here, essentially cylindrical carrier element has a length which is essentially equal to, or somewhat shorter than, the stretched length of the measuring tube. In keeping with this and with reference to the above-mentioned dimensions of the at least one measuring tube 4, the carrier element, in one embodiment of the measurement transducer, has a length likewise of at least about 1000 mm. Preferably, the cylindrical carrier element is implemented, however, with a length of more than 1200 mm. Furthermore, the carrier element, especially for the case in which it is made of steel, has a mass of at least 70 kg. In a further embodiment of the first variant of the measurement transducer, the carrier element is, however, so embodied and so dimensioned, that its mass amounts to more than 140 kg. Corresponding to this, the measurement transducer of the invention is so embodied and so dimensioned that a mass ratio of a total mass of the outer oscillation system to a total mass of the inner oscillation system can, without more, be smaller than 3, especially smaller than 2.

The housing cap 7 serving for the housing of the tube segment 41 includes, as shown schematically in FIG. 3, a trough-shaped cap segment 10c, as well as an essentially planar, first, lateral housing segment 10a and a second lateral housing segment 10b essentially mirror symmetric thereto. The form of the cap segment 10c corresponds, as evident, without more, from the combination of FIGS. 3a and 3b, essentially to that of a toroidal shell. In keeping with this, the cap segment 10c has an essentially circular arc-shaped, preferably semicircularly shaped, cross section of predetermined radius r and, at least virtually, an essentially circular arc-shaped, first segment edge 10c with an essentially larger radius R in comparison to the radius r, as well as a second segment edge 10c' formed essentially identically to the first segment edge. In case required, both the cross section and the segment need not be ideally circular, but can, instead be slightly elliptical. As is clear from the combination of FIGS. 1, 2 and 3, the lateral housing segments 10a, 10b are each connected via a circular arc-shaped, edge segment 10a, 10b, respectively, with the first, respectively second edge segment 10c, 10c' of the cap segment 10c, and, indeed, in such a manner that the lateral housing segments 10a, 10b are each oriented in a tangential plane of the cap segment 10c and, consequently, are oriented essentially aligned with a tangent to the associated edge segment 10ca, 10cb, respectively. Stated differently, between the cap segment and the housing segment 10c, 10a, respectively the cap segment and the housing segment 10c, 10b, there is, in each case, a largely continuous, thus as smooth as possible, transition created, in which, in the case of allowed internal excess pressure, there are, as much as possible, no, or only very little, bending stresses produced. Moreover, the housing cap is affixed to the carrier element 6 via a third edge segment 10c+ and a fourth edge segment 10c# of the cap segment 10c, as well as via, in each case, a second edge segment 10a', 10b' of the first and second lateral housing segments 10a, 10b, and, indeed, in such a manner that the cap segment and the housing segments 10c, 10a, 10b remain spaced from the at least one vibrating tube segment 41 during operation. For manufacturing the housing cap 7, the segments 10c, 10a, 10b are e.g. in each case, prefabricated separately and subsequently joined together, especially welded together. Advantageously, in the manufacture of the housing cap 7, e.g. also the method described in the already mentioned WO-A 03/021202 for manufacture of a metal cap usable as a housing cap 7 can be used, in which this is formed by welding of two essentially identically formed cap halves, especially halves cut out of a plate-shaped stock, with an edge bead, especially a bead in the shape of a quarter-torus. Further, the housing cap 7 can also be deep-drawn from a metal sheet of appropriate thickness.

In an embodiment of this first variant of the measurement transducer, the housing cap 7 is so dimensioned that it has, especially when using steel as housing material, a mass of at least 10 kg, especially, however, of more than 20 kg. Considering that the carrier element can, by all means, have a mass of 70 kg or more, it is clear that the transducer housing mass can amount to at least 80 kg, especially, however, to more than 160 kg. However, for the above mentioned case where the flanges and/or distributer pieces are provided for the total mass of the outer oscillation system in the measurement transducer and these, to such extent, also make up part of the outer oscillation system, a correspondingly higher mass must be computed and considered when matching the outer to the inner, oscillation system. At least to such extent, the mass of the total outer oscillation system can amount, without more, also to 200 kg or considerably beyond. Especially in the case of use of measuring tubes with an inner diameter of more than 100 mm, a mass of far more than 300 kg can be computed.

In the example of an embodiment of the first variant of the measurement transducer 1 shown here, as shown schematically in FIGS. 4 and 6, transport eyes are affixed to the carrier element 6 at the inlet and outlet ends. These eyes serve to provide defined attachment points for possible installing aids, such as e.g. appropriate cables or belts of lifting equipment, in order better to avoid damaging of the possibly more than 500 kg heavy measurement transducer, for example as a result of inappropriate transport and/or unsuitable choice of attachment points.

In a second variant of the measurement transducer, carrier element 6 of the transducer housing 10 is provided in the form of a carrier frame, which is so connected mechanically with the at least one measuring tube 4 at the inlet and outlet ends, that the at least one bent tube segment extends within the carrier frame. Additionally, the transducer housing 10 includes, in the case of this variant of the measurement transducer, a first housing segment arranged laterally alongside the at least one bent tube segment 41 of the at least one measuring tube 4 and affixed laterally on the carrier frame, especially lastingly and/or medium-tightly, as well as a second housing segment arranged laterally alongside the at least one bent tube segment of the at least one measuring tube and affixed on the carrier frame, especially lastingly and/or medium-tightly. The two housing segments are, in such case, arranged lying opposite to one another in such a manner that the at least one bent tube segment of the at least one measuring tube extends at least sectionally between the two housing segments.

As is apparent from the combination of FIGS. 5 to 7 and 9 to 11, both in the case of the example of an embodiment for the first variant of the measurement transducer and also in the case of the example of an embodiment for the second variant of the measurement transducer, the carrier cylinder, or the carrier frame, as the case may be, and the two housing segments are moreover so formed and the two housing segments, especially segments which are essentially plate-shaped, are each so connected laterally with the carrier cylinder, or carrier frame, as the case may be, that they extend at least sectionally laterally essentially parallel to the bent tube segment 41. In a further development of the first and/or the second variant of the measurement transducer 1, it is provided, especially for the case in which steel serves as material for the housing segments, that the transducer housing has a minimum wall thickness smaller than 6 mm.

As can be deduced from the above explanations without difficulty, the inner oscillation system of the measurement transducer 1 formed by the at least one measuring tube 4, by the medium conveyed at least instantaneously therein, and, at least in part, by the exciter mechanism 60 and the sensor arrangement 70, executes during operation of the measurement transducer 1, at least at times, mechanical oscillations with at least one wanted oscillation frequency $F_n$, with the mechanical oscillations being in the form, at least at times and/or at least in part, of lateral oscillations, especially bending oscillations. The wanted oscillation frequency $F_n$ is, in such case, in manner known to those skilled in the art, dependent both on the size, shape and material of the measuring tube 4 and, especially, on an instantaneous density of the medium, and, within these constraints, variable during operation of the measurement transducer within a predetermined wanted frequency band $\Delta F_n$ exhibiting a lower and an upper limit frequency. In a further development of the measurement transducer, it is provided during operation of the same that the instantaneous wanted oscillation frequency $F_n$ of the inner oscillation system is so controlled and so tuned that it corresponds essentially to an instantaneous, natural eigenfrequency of the inner oscillation system.

As already indicated above, the transducer housing 10 itself has a multiplicity of natural oscillation modes. Furthermore, it results from the above explanations, that the mass ratio of the total mass of the outer oscillation system to the total mass of the inner oscillation system, at least when using comparatively large measuring tubes, can, at least at times, be markedly smaller than the above-discussed critical value of 4, as a result of which also eigenmodes of the external oscillation system, especially of the housing segments, can be established quite near to the wanted frequency band $\Delta F_n$ or even within such, for the case in which the transducer housing, in conventional manner, would be allowed to oscillate freely. For suppressing or extinguishing at least one natural oscillation mode of the transducer housing disturbing oscillations of the measuring tube potentially and, to such extent, also the measurement, the measurement transducer 10 of the invention, therefore, has additionally at least a first support element 13a affixed, especially directly, to the transducer housing and serving for the formation of essentially locationally fixed oscillation nodes in the transducer housing. This support element 13a, to such extent, belongs likewise to the outer oscillation system of the measurement transducer. Therefore, by means of the at least one support element, essentially a blocked frequency band $\Delta F_s$ is created against potentially harmful disturbing frequencies $F_s$ of the outer oscillation system. The at least one support element 13a and the transducer housing 10 are, in such case, especially so matched to one another that the blocked frequency band $\Delta F_s$ has a bandwidth, which, at least with a band width of the wanted frequency band $\Delta F_n$ initially calibrated as measuring range and, to this extent, predetermined, is at least congruent and, if possible, even somewhat greater than the band width of the wanted frequency band. Stated differently, in the case of measurement transducers of the invention, it can be quite acceptable that the outer oscillation system of the measurement transducer possibly also has at least one oscillation mode with a lowest natural eigenfrequency, which is smaller than the predetermined, lower limit frequency of the wanted frequency band $\Delta F_n$.

Considering that the inner oscillation system is caused, during operation, to oscillate at a natural eigenfrequency, it is further to be assured that it at least has an oscillation mode with a natural eigenfrequency, which, during operation, is always greater than the lowest natural eigenfrequency of the outer oscillation system. Equally, the inner oscillation system has at least one oscillation mode with a natural eigenfrequency, which, during operation, is always smaller than the upper limit frequency of the wanted frequency band $\Delta F_n$. In an embodiment of the measurement transducer, the outer and inner oscillation systems are, in such case, so matched to one another that the wanted frequency band $\Delta F_n$ of the inner oscillation system and, accordingly, also the blocked frequency band $\Delta F_s$ of the outer oscillation system each have a bandwidth of at least 50 Hz. In a further embodiment of the measurement transducer, a lower limit frequency of the blocked frequency band is, therefore, selected to be at least 5% and/or 10 Hz smaller that the predetermined lower limit frequency of the wanted frequency band $\Delta F_n$. Consequently, the measurement transducer of the invention is also suited for measuring those media flows whose density during operation of the measurement transducer fluctuates by more than 20 kg/m$^3$, such as can be the case for two or more phase media flows or also in the case of discontinuous media streams.

In a further embodiment of the measurement transducer, the lower limit frequency of the wanted frequency band $\Delta F_n$ is preferably calibrated, and, to such extent, also the lower limit frequency of the blocked frequency band $\Delta F_s$ is set, for media having a density of more than 400 kg/m$^3$. Especially, the lower limit frequency of the wanted frequency band $\Delta F_n$ is further given, and, accordingly, the lower limit frequency of the blocked frequency band $\Delta F_s$ is so selected, that it corresponds to an eigenfrequency of the inner oscillation system, when a medium with a density of smaller than or equal to 2000 kg/m$^3$ is flowing in the at least one measuring tube 4. In another embodiment of the measurement transducer 1, the upper limit frequency of the wanted frequency band $\Delta F_n$ is for the state in which the density of the medium is essentially zero, thus about equal to a density of air.

It is to be noted here further that the wanted oscillation frequency $F_n$ of the inner oscillation system, in the case of measurement transducers of the described kind, usually is dependent on, or at least controlled as a function of, an instantaneous viscosity of the medium. Accordingly, in a further embodiment, the upper limit frequency of the wanted frequency band $\Delta F_n$ is given by the state in which the viscosity of the medium is smaller than $100 \cdot 10^{-6}$ Pas, especially about equal to a viscosity of air. Since the measurement transducer is provided especially also for the measuring of oils, especially petroleum, the lower limit frequency of the wanted frequency band $\Delta F_n$ is predetermined in a further embodiment for a medium, whose viscosity is greater than $300 \cdot 10^{-6}$ Pas. Furthermore, the lower limit frequency of the wanted frequency band $\Delta F_n$ in a further embodiment of the measurement transducer is then given for the case in which the viscosity of the medium is smaller than $3000 \cdot 10^{-6}$ Pas.

In an embodiment of the outer oscillation system of the measurement transducer 1, the transducer housing 10 and the at least one support element 13a are so formed and so connected mechanically together that the outer oscillation system during operation executes, at the most, at least within the wanted frequency band $\Delta F_n$, only those undesired disturbance oscillations for which a disturbance oscillation power instantaneously dissipated by the disturbance oscillations is substantially smaller than a wanted oscillation power instantaneously dissipated by the oscillations of the inner oscillation system at wanted oscillation frequency. For example, an average value of all oscillation powers instantaneously dissipated by disturbance oscillations within the wanted frequency band $\Delta F_n$ can be considered as the disturbance oscillation power. For the high accuracy of measurement required in the practice, it has, in such case, further proved to be of advantage, if a corresponding wanted-to-disturbance power ratio of the wanted oscillation power to the disturbance oscillation power is greater than 5, at least, however, greater than 2. For example, an average value of all oscillation powers instantaneously dissipated by disturbance oscillations within the wanted frequency band $\Delta F_n$ can serve as a measure for the disturbance oscillation power. Alternatively or in supplementation thereto, the transducer housing 10 and the at least one support element 13a are so formed and so connected mechanically together that the outer oscillation system, during operation, at least within the wanted frequency band $\Delta F_n$, executes no, or, at most, only such undesired disturbance oscillations where an instantaneous, maximum disturbance oscillation amplitude of the disturbance oscillations of the outer oscillation system is substantially smaller than an instantaneous maximum oscillation amplitude of the oscillations of the inner oscillation system, especially of the measuring tube 4 itself. Additionally, the transducer housing 10 and the at least one support element 13a can also be so formed and so connected together that an instantaneous disturbance oscillation quality factor of the disturbance oscillations possibly executed by the outer oscillation system is substantially smaller than an instantaneous wanted oscillation quality factor of the oscillations of the inner oscillation system at the wanted oscillation frequency $\Delta F_n$. In a further embodiment of the invention, the transducer housing 10 and the at least one support element 13a are so formed and so connected mechanically together that a wanted-to-disturbance amplitude ratio of the instantaneously maximum oscillation amplitude of the oscillations of the inner oscillation system to the instantaneously maximum disturbance oscillation amplitude is greater than 1.5, especially, however, greater than 2 and/or that a wanted-to-disturbance oscillation quality factor ratio of the instantaneous wanted oscillation quality factor to the instantaneous disturbance oscillation quality factor amounts to at least 50:1, especially greater than 80.

For suppressing the at least one disturbing oscillation mode of the transducer housing 10 as effectively as possible, the at least one support element is affixed to the same, at least pointwise, in an area of the transducer housing, in which such oscillation mode has an oscillation antinode, especially a local oscillation amplitude, or at least would have, if the support element had not been applied to the transducer housing. In the case of the example of an embodiment illustrated here, the at least one support element 13a is embodied by means of at least one solid plate (for example, likewise made of steel), which, as evident, without more, from the FIGS. 3a, b, 4 to 7, as well as 9 and 10, is connected, especially at least partially releasably, with the transducer housing 10 at at least two, mutually oppositely lying, affixation locations 11a, 12a. Preferably, the at least one support element 13a is further, at least pointwise, welded and/or soldered, especially hard soldered, or brazed, with the transducer housing 10. Alternatively or in supplementation thereof, the at least one support element 13a can have an, at least pointwise, screwed attachment with the transducer housing 10, especially with the housing segments running laterally to the measuring tube 4.

In a further embodiment of the measurement transducer, the at least one support element is, accordingly, as evident, without more, from the combination of FIGS. 4 to 7, as well as 9 and 10, at least partly affixed to the housing segments of the transducer housing 10 running laterally to the measuring tube, by means of a bolt, as well as a washer screwed thereon and/or welded therewith, for holding the housing segment with as little gap as possible against the support element, possibly with interpositioning of disk springs and/or damping washers. As also shown by way of example in FIG. 7, the at least one support element 13a can, moreover, be affixed additionally, at least in part, also to the carrier element—here the carrier cylinder—e.g. by means of welding or soldering. Instead of such bonding of materials, or in supplementation thereof, of course, also appropriate screw connections can serve for affixing the support element 13a to the carrier element.

In a further development of the measurement transducer of the invention, additionally at least a first oscillation-damping inlay 14a, damping possible oscillations of the transducer housing 10, is provided coupled to the transducer housing 10, especially extending at least sectionally between the at least a first, oscillation-damping support element and the transducer housing. Inlay 14a can e.g. be made of a plastic, a rubber, a silicone or the like, and have, for example, the form of a strip or a mat. In an embodiment of this further development of the invention, the inlay 14a is so formed and so arranged in the measurement transducer that it extends, at least sectionally, between the at least one support element 13a and the transducer housing 10. For the above-described case in which the transducer housing has the carrier cylinder 6, the inlay 14 can alternatively or in supplementation of the preceding embodiment, also be so arranged in the measurement transducer that it extends, at least sectionally, along the carrier cylinder 6 and, in such case, also makes flush contact. Moreover, still other, like, oscillation-damping inlays 14b can be inserted in the measurement transducer, arranged internally on the transducer housing.

In another, further development of the measurement transducer, at least a second support element 13b is additionally provided, likewise affixed to the transducer housing 10 and serving for the formation of essentially locationally fixed oscillation nodes in the transducer housing 10, with the outer oscillation system of the measurement transducer 1 including, in the case of this further development, then, at least also the second support element 13b. In an embodiment of this further development of the measurement transducer, the first support element 13a and the second support element 13b, especially a second support element 13b likewise affixed directly to the transducer housing 10, are constructed essentially identically to one another. Also, in the case of this further development of the measurement transducer, the first support element 13a is affixed to the transducer housing 10 at least partly in the vicinity of the first oscillation sensor 71, 72, and the second support element 13b at least partly in the vicinity of the second oscillation sensor 81, 82. In an additional embodiment of this further development of the measurement transducer, such includes also a third support element 13c likewise affixed, especially directly, to the transducer housing and likewise serving for the formation of essentially locationally fixed oscillation nodes in the transducer housing, with the outer oscillation system of the measurement transducer, to such extent, then including at least also the third support element. As evident from FIG. 4, the third support element is, in the case of the example of an embodiment illustrated here, at least partly affixed in the vicinity of the oscillation exciter to the transducer housing 10, here to the cylindrical carrier element 6.

Figure 8:
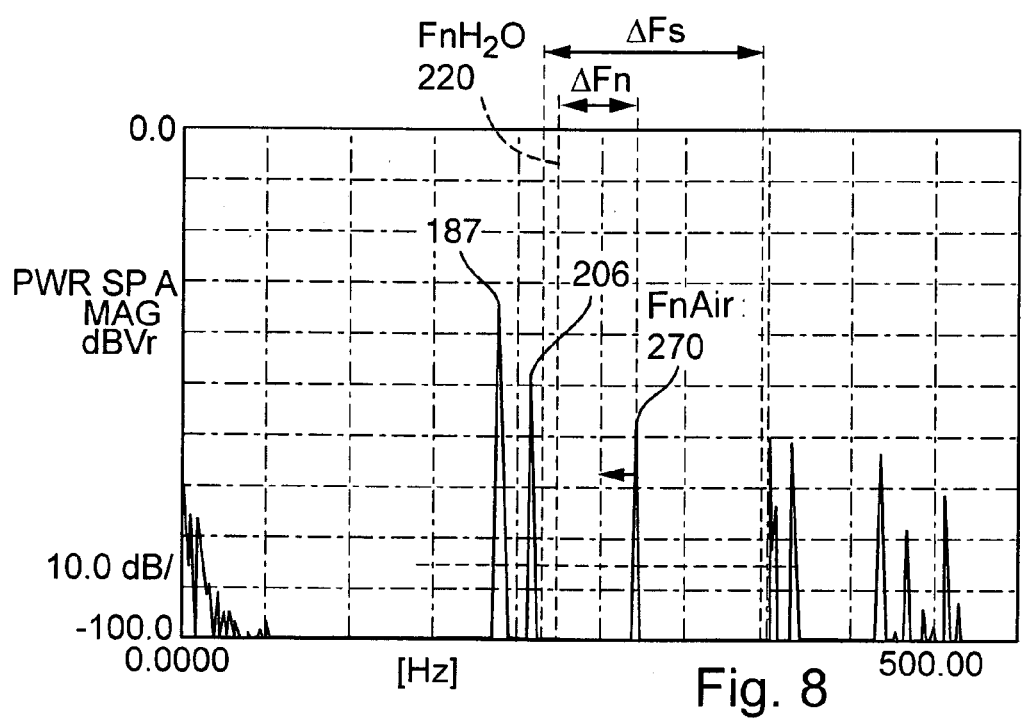
FIG. 8 shows an experimentally determined spectrum of mechanical eigenfrequencies of a measurement transducer according to FIGS. 4–7.

Experiments have shown that, already by means of just a few of such support elements, a blocked frequency band can, in very simple manner, be created for the outer oscillation system, in order to enable operation of the inner oscillation system in a wanted frequency band of sufficiently large bandwidth. For example, the frequency spectrum shown by way of example in FIG. 8 was experimentally determined for an outer oscillation system of a measurement transducer built according to the first variant with three support elements. Clearly perceivable is that the outer oscillation system has practically no natural oscillation modes between about 210 Hz and far beyond 270 Hz, with the wanted frequency band for the same measurement transducer lying, in turn, between about 210 Hz and 270 Hz. Additionally, it has been found that both the bandwidth of the blocked frequency band and also its position in the frequency spectrum can be adjusted easily, for the wanted frequency band to be expected in the actual operation of the measurement transducer, by small changes of the shape and/or the position of the support elements. Thus, by the use of the support elements, it is also possible to manufacture measurement transducers of the described kind cost-effectively, even with larger nominal diameters of 250 mm or above, on the one hand, also with a measuring accuracy of above 99.8% and, on the other hand, to hold the installed dimensions and the installed mass of such measurement transducers sufficiently within limits, such that, in spite of large nominal diameter, transport, installation and operation can be accomplished still in economically reasonable fashion.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A vibration-type measurement transducer for measuring a flowable medium conveyed in a pipeline, especially a gas, liquid, powder or other flowable substance, comprising:
    a transducer housing, which exhibits a multiplicity of natural oscillation modes;
    at least a one measuring tube for conveying at least a volume fraction of the medium to be measured, said at least one measuring tube being held oscillatably in said transducer housing and vibrating, at least at times;
    an electromechanical exciter mechanism acting on said at least one measuring tube for producing and/or maintaining mechanical oscillations of said at least one measuring tube;
    a sensor arrangement reacting to movements of said at least one measuring tube for producing at least one oscillation measurement signal representing oscillations of said at least one measuring tube; and
    at least a one support element fixed to said transducer housing and serving for the formation of essentially locationally fixed oscillation nodes in said transducer housing for suppressing and erasing at least one natural oscillation mode of the transducer housing, respectively, wherein:
    an outer oscillation system of the measurement transducer is formed by said transducer housing and at least said at least one support element and an inner oscillation system of the measurement transducer is formed by said at least one measuring tube, the medium at least instantaneously conveyed therein, and, at least in part, by said electromechanical exciter mechanism and said sensor arrangement; and
    said inner oscillation system, driven by said exciter mechanism, executes, at least at times during operation of the measurement transducer, mechanical oscillations having at least one wanted oscillation frequency, said at least one wanted oscillation frequency being both dependent on size, form and material of said at least one measuring tube as well as also on an instantaneous density of the medium, and said at least one wanted oscillation frequency being variable within a predetermined, wanted, frequency band, during operation of the measurement transducer, said frequency band having a lower limit frequency and an upper limit frequency.

2. The measurement transducer as claimed in claim 1, wherein:
    said transducer housing and said at least one support element are so formed and so connected mechanically together, that the outer oscillation system of the measurement transducer at least formed thereby, in spite of the oscillations of said at least one measuring tube, executes, at least within the wanted frequency band, no, or possibly only such undesired, disturbance oscillations, of which an instantaneously dissipated, disturbance oscillation power is substantially smaller than a wanted oscillation power instantaneously dissipated at the wanted oscillation frequency by the oscillations of said inner oscillation system.

3. The measurement transducer as claimed in claim 1, wherein:
    a wanted-to-disturbance power ratio of the wanted oscillation power to the disturbance oscillation power is at least greater than 2, especially greater than 5.

4. The measurement transducer as claimed in claim 2, wherein:
    the disturbance oscillation power corresponds to an average value of all oscillation powers instantaneously dissipated within the wanted frequency band by disturbance oscillations.

5. The measurement transducer as claimed in claim 1, wherein:
    said transducer housing and said at least one support element are so formed and so mechanically connected together, that said outer oscillation system of the measurement transducer formed at least thereby executes, at least within the wanted frequency band and despite the oscillations of said at least one measuring tube, no or possibly only such undesired disturbance oscillations, of which an instantaneously maximum disturbance oscillation amplitude is substantially smaller than an instantaneously maximum oscillation amplitude of the oscillations of said inner oscillation system, especially of said at least one measuring tube itself.

6. The measurement transducer as claimed in claim 1, wherein:

a wanted-to-disturbance amplitude ratio of the instantaneously maximum oscillation amplitude of the oscillations of said inner oscillation system to the instantaneously maximum disturbance oscillation amplitude is greater than 1.5, especially greater than 2.

7. The measurement transducer as claimed in claim 1, wherein:

said transducer housing and said at least one support element are so formed and so connected mechanically together that the measurement transducer outer oscillation system, at least formed thereby, executes, in spite of the oscillations of said at least one measuring tube and at least within the wanted frequency band, no, or possibly only such, undesired disturbance oscillations, of which an instantaneous disturbance oscillation quality factor is substantially smaller than an instantaneous wanted oscillation quality factor of the oscillations of said inner oscillation system at the wanted oscillation frequency.

8. The measurement transducer as claimed in claim 1, wherein:

a wanted-to-disturbance oscillation quality factor ratio of the instantaneous wanted oscillation quality factor to the instantaneous disturbance oscillation quality factor is at least 50:1, especially greater than 80.

9. The measurement transducer as claimed in claim 1, wherein:

said transducer housing includes an, especially steel, carrier element, with which said at least one measuring tube is mechanically connected at its inlet and outlet ends.

10. The measurement transducer as claimed in claim 9, wherein:

said carrier element is embodied as an, especially essentially tubular, carrier cylinder, with which said at least one measuring tube is mechanically connected at its inlet and outlet ends.

11. The measurement transducer as claimed in claim 10, wherein:

said carrier element shows at least one of the following properties: a mass of at least 70 kg, especially of more than 140 kg, and a length of at least 1000 mm, especially of more than 1200 mm.

12. The measurement transducer as claimed in claim 1, wherein:

said at least one measuring tube has at least one bent tube segment.

13. The measurement transducer as claimed in claim 12, wherein:

said at least one measuring tube has at least one tube segment curved in essentially U- or V-shape.

14. The measurement transducer as claimed in claim 12, wherein:

said transducer housing includes: an essentially cylindrically shaped carrier element, especially one made of steel, which is mechanically connected with said at least one measuring tube at its inlet and outlet ends, and a housing cap arranged spaced from said at least one measuring tube and affixed, especially lastingly and/or medium-tightly, to said carrier element for housing at least said at least one bent tube segment of said at least one measuring tube.

15. The measurement transducer as claimed in claim 14, wherein:

said carrier cylinder has a mass of at least 70 kg, especially of more than 140 kg and/or wherein said housing cap has a mass of at least 10 kg, especially of more than 20 kg.

16. The measurement transducer as claimed in claim 14, wherein;

said housing cap includes housing segments arranged laterally next to said at least one bent tube segment of said at least one measuring tube, especially running at least sectionally essentially parallel to said bent tube segment and/or having an essentially plate-shape.

17. The measurement transducer as claimed in claim 14, wherein:

said at least one support element is affixed, at least in part, to said housing cap.

18. The measurement transducer as claimed in claim 17, wherein:

said at least one support element, which is affixed both to said housing cap and to said cylindrical carrier element, at least pointwise, especially at least partly releasably and/or at least pointwise by way of material bonding.

19. The measurement transducer as claimed in claim 1, further comprising:

at least one oscillation-damping inlay provided coupled to said transducer housing, especially extending at least sectionally between said at least one support element and said transducer housing.

20. The measurement transducer as claimed in claim 1, further comprising:

a further support element likewise affixed, especially directly, to said transducer housing, especially a further support element essentially identical to said one support element, for forming essentially locationally fixed oscillation nodes in said transducer housing, wherein:

said outer oscillation system of the measurement transducer also includes at least also said further support element.

21. The measurement transducer as claimed in claim 20, wherein:

said sensor arrangement includes a first oscillation sensor, especially a first oscillation sensor arranged on the inlet end of said at least one measuring tube, as well as a second oscillation sensor, especially a second oscillation sensor arranged on the outlet end of said at least one measuring tube, and said one support element is affixed to said transducer housing at least in part in the vicinity of the first oscillation sensor and said further support element at least in part in the vicinity of said second oscillation sensor.

22. The measurement transducer as claimed in claim 21, further comprising:

a third support element likewise affixed, especially directly, to said transducer housing for forming essentially locationally fixed, oscillation nodes in said transducer housing, with said outer oscillation system of the measurement transducer then including at least also said third support element.

23. The measurement transducer as claimed in claim 22, wherein:

said exciter mechanism includes at least one oscillation exciter, especially an exciter arranged halfway on said at least one measuring tube, and said third support element is at least in part affixed to said transducer housing in the vicinity of said oscillation exciter.

24. The measurement transducer as claimed claim 1, further comprising:
for connecting the measurement transducer to the pipeline, a first connection flange at an inlet end and a second connection flange at an outlet end, wherein:
said outer oscillation system of the measurement transducer then includes at least also said first and second connection flanges, and
each of the two connection flanges has a mass of more than 50 kg, especially of more than 60 kg.

25. The measurement transducer as claimed in claim 1, further comprising:
a further measuring tube essentially identical to said at least one measuring tube and/or extending essentially parallel to said at least one measuring tube.

26. The measurement transducer as claimed in claim 25, further comprising:
a first manifold connecting said measuring tubes together at their inlet ends, as well as a second manifold connecting said measuring tubes together at their outlet ends, wherein:
said outer oscillation system of the measurement transducer then includes at least also the first and second manifolds, wherein each of said two manifolds has a mass of more than 10 kg, especially more than 20 kg.

27. The measurement transducer as claimed in claim 1, wherein:
said outer oscillation system of the measurement transducer shows at least one oscillation mode having a lowest natural eigenfrequency, which is smaller than the lower limit frequency of the wanted frequency band, and/or
said outer oscillation system shows at least one oscillation mode with a natural eigenfrequency, which is smaller than the upper limit frequency of the wanted frequency band and which is greater than the lower limit frequency of the wanted frequency band.

28. The measurement transducer as claimed in claim 27, wherein:
said inner oscillation system has at least one oscillation mode with a natural eigenfrequency, which is, during operation, always greater than the lowest natural eigenfrequency of said outer oscillation system.

29. The measurement transducer as claimed in claim 1, wherein:
the wanted frequency band has a band width of at least 20 Hz, especially of more than 50 Hz.

30. The measurement transducer as claimed in claim 1, wherein:
said at least one measuring tube shows at least one of the following properties: a mass of at least 10 kg, especially of greater than 25 kg, an inner diameter of at least 80 mm, especially greater than 100 mm, and a stretched length of at least 1000 mm, especially greater than 1500 mm.

31. The measurement transducer as claimed in claim 1, wherein:
said transducer housing has a mass of at least 80 kg, especially of more than 160 kg.

32. The measurement transducer as claimed in claim 1, wherein:
a total mass of said inner oscillation system amounts to at least 70 kg, especially, during operation, at least at times, greater than 90 kg.

33. The measurement transducer as claimed in claim 1, wherein:
a total mass of said outer oscillation system amounts to at least 200 kg, especially to greater than 300 kg.

34. The measurement transducer as claimed in claim 1, wherein:
a mass ratio of a total mass of said outer oscillation system to a total mass of said inner oscillation system is, during operation, at least at times, smaller than 3, especially smaller than 2.5.

35. The measurement transducer as claimed in claim 34, wherein:
the mass ratio of the total mass of said outer oscillation system to the total mass of said inner oscillation system is continuously smaller than 3.

36. The measurement transducer as claimed in claim 1, wherein:
an installed mass to nominal diameter ratio of an installed mass of said total measurement transducer to a nominal diameter of the measurement transducer corresponding to a caliber of the pipeline, in whose course the measurement transducer is to be inserted, amounts to at least 1.5 kg/mm, especially to greater than 2 kg/mm.

37. The measurement transducer as claimed in claim 1, wherein:
the installed mass of said total measurement transducer is greater than 200 kg, especially greater than 400 kg.

38. Use of a measurement transducer including:
a transducer housing, which exhibits a multiplicity of natural oscillation modes;
at least a one measuring tube for conveying at least a volume fraction of the medium to be measured, said at least one measuring tube being held oscillatably in said transducer housing and vibrating, at least at times;
an electromechanical exciter mechanism acting on said at least one measuring tube for producing and/or maintaining mechanical oscillations of said at least one measuring tube;
a sensor arrangement reacting to movements of said at least one measuring tube for producing at least one oscillation measurement signal representing oscillations of said at least one measuring tube; and
at least a one support element fixed to said transducer housing and serving for the formation of essentially locationally fixed oscillation nodes in said transducer housing for suppressing and erasing at least one natural oscillation mode of the transducer housing, respectively, wherein:
an outer oscillation system of the measurement transducer is formed by said transducer housing and at least said at least one support element and an inner oscillation system of the measurement transducer is formed by said at least one measuring tube, the medium at least instantaneously conveyed therein, and, at least in part, by said electromechanical exciter mechanism and said sensor arrangement; and
said inner oscillation system, driven by said exciter mechanism, executes, at least at times during operation of the measurement transducer, mechanical oscillations having at least one wanted oscillation frequency, said at least one wanted oscillation frequency being both dependent on size, form and material of said at least one measuring tube as well as also on an instantaneous density of the medium, and said at least one wanted oscillation frequency being variable within a predetermined, wanted, frequency band, during operation of the measurement transducer, said frequency band having a lower limit frequency and an upper limit frequency.
for measuring a flowable medium conveyed in a pipeline having a caliber of greater than 150 mm, especially of greater than 250 mm or above, and/or for measuring a mass flow rate of a medium flowing through a pipeline at a rate, at least at times, of greater than 900 t/h, especially, at least at times, of more than 1200 t/h.

* * * * *